US012163657B2

(12) United States Patent
Pahlevaninezhad et al.

(10) Patent No.: US 12,163,657 B2
(45) Date of Patent: Dec. 10, 2024

(54) OPTICAL LENS FOR UNIFORM LIGHT-DISTRIBUTION AND METHOD OF MANUFACTURING SAME

(71) Applicant: 10644137 CANADA INC., Calgary (CA)

(72) Inventors: Hamid Pahlevaninezhad, Lexington, MA (US); Aria Moaven, Calgary (CA); Majid Pahlevaninezhad, Calgary (CA); Sam Scherwitz, Calgary (CA)

(73) Assignee: 10644137 CANADA INC., Calgary (CA)

( * ) Notice: Subject to any disclaimer, the term of this patent is extended or adjusted under 35 U.S.C. 154(b) by 0 days.

(21) Appl. No.: 18/315,007

(22) Filed: May 10, 2023

(65) Prior Publication Data

US 2023/0366526 A1    Nov. 16, 2023

Related U.S. Application Data

(60) Provisional application No. 63/340,081, filed on May 10, 2022.

(51) Int. Cl.
*F21V 5/04*    (2006.01)
*G02B 27/28*    (2006.01)
*F21Y 115/10*    (2016.01)

(52) U.S. Cl.
CPC ............ *F21V 5/048* (2013.01); *G02B 27/283* (2013.01); *F21Y 2115/10* (2016.08)

(58) Field of Classification Search
CPC .............................. G02B 27/283; F21V 5/048
See application file for complete search history.

(56) References Cited

U.S. PATENT DOCUMENTS

| | | | |
|---|---|---|---|
| 2008/0007966 A1* | 1/2008 | Ohkawa | G02B 5/045 |
| | | | 362/608 |
| 2011/0164426 A1* | 7/2011 | Lee | G02B 19/0014 |
| | | | 362/335 |
| 2016/0077261 A1* | 3/2016 | Arbabi | G02B 5/3083 |
| | | | 359/493.01 |

* cited by examiner

*Primary Examiner* — Evan P Dzierzynski
*Assistant Examiner* — Nathaniel J Lee
(74) *Attorney, Agent, or Firm* — Osha Bergman Watanabe & Burton LLP

(57) ABSTRACT

An optical lens for passing therethrough an incident light beam and forming an output light beam towards a target plane at a distance therefrom and perpendicular to the norm thereof. The optical lens has a smooth or piecewise-linear first surface having a cross-section profile along an axis perpendicular to the norm of the optical lens for directing the incident light beam to form the output light beam towards the target plane with a light intensity uniformly distributed in a target area of the target plane. In some embodiments, the cross-section profile of the first surface has a concave curve in the central portion thereof smoothly transitioning to a convex curve in the peripheral portion on each side of the central portion for directing the incident light beam to the target plane with the light intensity uniformly distributed in the target area of the target plane.

18 Claims, 17 Drawing Sheets

Ray mapping

OPTICAL LENS FOR UNIFORM LIGHT-DISTRIBUTION AND METHOD OF MANUFACTURING SAME

CROSS-REFERENCE TO RELATED APPLICATIONS

This application claims the benefit of U.S. Provisional Patent Application Ser. No. 63/340,081, filed May 10, 2022, the content of which is incorporated herein by reference in its entirety.

FIELD OF THE DISCLOSURE

The present disclosure relates generally to an optical lens and in particular to an optical lens for uniform light-distribution and method of manufacturing same.

BACKGROUND

Light sources have been used in a wide variety of areas. Recently, the so-called solid-state lighting (SSL) (see Reference [1]), which uses various types of Light Emitting Diodes (LEDs) (see References [2-5]) as the light sources, has been quickly developed and widely used. The old LED technology before the 1990s (see Reference [6]) has much lower electromagnetic power compared to other lighting devices and hence can only used as indicator light sources. However, today's LEDs may provide comparable or higher light emission than conventional light sources. Moreover, unlike conventional light sources, SSL sources convert the electrical energy directly to the electromagnetic one, thereby leading to higher efficiency and longer life-time. Similar to the famous Moore's law, the Haitz's law (see Reference [7]) predicts that the LED output power will increase by a factor of twenty and the LED price will decrease by a factor of ten in each decade. Today, most of the lighting sources, such as indoor lights, street lights, grow lights (see Reference [8] to [12]), and the like, have been converted to or are converting to SSLs.

A key part of the grow-light systems is their light irradiance uniformity. Light uniformity refers to how even or uniform the light is distributed across a target plane (which is the plant canopy for horticultural applications). Light intensity uniformity (U) is defined as:

$$U = \frac{E_{min}}{E_{max}} \quad (1)$$

For growers, uniform lighting is generally preferable since otherwise the part of the plants that receive higher light intensity will grow more than other parts, resulting in non-uniform plant growth in a greenhouse. In addition, growers need to ensure a minimum level of light intensity or Daily Light Integral (DLI) for each plant as required. Simply increasing the output power of a non-uniform lighting system for meeting the minimum light intensity requirement may cause hotspots on the high-intensity parts of the plants which may cause problems such as tip burning or excessive use of soil nutritions.

Many methods such as zero-etendue and extended source algorithms (see Reference [13]) for providing uniform lighting systems are available for designing an optical element for an extended source such as LED. Zero-etendue algorithms generally consider the distance between the lens and the LED is sufficiently large such that the size of the LED die may be ignored and thus the LED may be consider as a point light-source that has Lambertian radiant intensity. Ray-mapping, Monge-Ampere, and supporting quadric method (SQM) are some of the most well-known zero-etendue algorithms.

In indoor and/or outdoor lighting applications, it is usually preferable to have sufficient area coverage. However, one of the problems of the ray-mapping method is that it cannot be applied to large cones of light and thus may require sophisticated design for large area coverage.

While most of the plants in greenhouses have a small longitudinal growth, some plants may have a large vertical growth compared to the distance from the light source to ground. Therefore, it is desirable to provide a light system with increased uniformity of light at any distance from the light source.

SUMMARY

According to one aspect of this disclosure, there is provided an optical lens for passing therethrough an incident light beam and forming an output light beam towards a target plane at a distance therefrom and perpendicular to the norm thereof, the optical lens comprising: a smooth or piecewise-linear first surface having a cross-section profile along an axis perpendicular to the norm of the optical lens for directing the incident light beam to form the output light beam towards the target plane with a light intensity uniformly distributed in a target area of the target plane.

In some embodiments, a cross-section of the optical lens along a plane parallel to the norm is a square shape.

In some embodiments, the first surface is symmetrical about the norm.

In some embodiments, the first surface is a surface for receiving the incident light beam or for outputting the output light beam.

In some embodiments, the cross-section profile of the first surface comprises a concave curve in the central portion thereof smoothly transitioning to a convex curve in the peripheral portion on each side of the central portion for directing the incident light beam to the target plane with the light intensity uniformly distributed in the target area of the target plane.

In some embodiments, the optical lens further comprises: a semi-spherical second surface on an opposite side of the first surface and about an origin of the optical lens.

In some embodiments, the cross-section profile of the first surface has a shape for modifying the incident light beam according to a light-modification function:

$$f_L(\theta) = k(\cos \theta)^{-3}$$

for a predefined angular range $\Theta < 90°$, where $0 \leq \Theta < 90°$ and k is a constant.

In some embodiments, the cross-section profile of the first surface has a shape for modifying the incident light beam such that light intensities in a plurality of concentric target-plane portions of the target area are same; and the plurality of concentric target-plane portions of the target area comprises a circular target-plane portion at the center of the target area and one or more target-plane rings concentrically about the circular central target-plane portion, and a radius of the circular central target-plane portion equals to a radial width of each of the target-plane rings.

In some embodiments, at least at a plurality of reference points x of the cross-section profile of the first surface, the cross-section profile has a tangent angle β with respect to the axis such that:

$$\frac{\sin\left(\tan^{-1}\left(\frac{x}{L_{chief}}\right) - \beta\right)}{\sin(\varphi - \beta)} = \frac{r_1}{r_2}$$

where $L_{chief}$ is a shortest distance between a first wavefront of the incident light beam at a lens plane of the optical lens and a second wavefront of a light beam outputting from the lens plane, φ is a phase difference between the first and second wavefronts, $r_1$ is a refractive index of a medium adjacent the optical lens, and $r_2$ is a refractive index of the optical lens.

In some embodiments, the cross-section profile of the first surface is a piecewise-linear curve along the plurality of reference points, or a smooth curve fitting to the piecewise-linear curve.

In some embodiments, the cross-section profile of the first surface is a smooth polynomial curve fitting to a piecewise-linear curve along the plurality of reference points.

According to one aspect of this disclosure, there is provided a lighting system comprising: one or more light sources; and one or more above-described optical lens; each of the one or more optical lens at a location corresponding to a respective one of the one or more light sources.

In some embodiments, one of the one or more light sources is embedded or integrated in the corresponding optical lens.

According to one aspect of this disclosure, there is provided a method comprising: determining a first surface of an optical lens for manufacturing the optical lens for passing therethrough an incident light beam and forming an output light beam towards a target plane at a distance therefrom and perpendicular to the norm thereof; said determining the first surface of the optical lens comprises: determining the first surface as a smooth or piecewise-linear surface having a cross-section profile along an axis perpendicular to the norm of the optical lens for directing the incident light beam to form the output light beam towards the target plane with a light intensity uniformly distributed in a target area of the target plane.

In some embodiments, a cross-section of the optical lens along a plane parallel to the norm is a square shape.

In some embodiments, the first surface is symmetrical about the norm.

In some embodiments, the first surface is a surface for receiving the incident light beam or for outputting the output light beam.

In some embodiments, the cross-section profile of the first surface comprises a concave curve in the central portion thereof smoothly transitioning to a convex curve in the peripheral portion on each side of the central portion for directing the incident light beam to the target plane with the light intensity uniformly distributed in the target area of the target plane.

In some embodiments, the method further comprises: determining a semi-spherical second surface on an opposite side of the first surface and about an origin of the optical lens.

In some embodiments, said determining the first surface of the optical lens comprises: determining the cross-section profile of the first surface such that the cross-section profile of the first surface has a shape for modifying the incident light beam according to a light-modification function:

$$f_L(\theta) = k(\cos \theta)^{-3}$$

for a predefined angular range Θ<90°, where 0≤Θ<90° and k is a constant.

In some embodiments, said determining the cross-section profile of the first surface of the optical lens comprises: determining the cross-section profile of the first surface of the optical lens such that the cross-section profile of the first surface has a shape for modifying the incident light beam such that light intensities in a plurality of concentric target-plane portions of the target area are same; and the plurality of concentric target-plane portions of the target area comprises a circular target-plane portion at the center of the target area and one or more target-plane rings concentrically about the circular central target-plane portion, and a radius of the circular central target-plane portion equals to a radial width of each of the target-plane rings.

In some embodiments, said determining the cross-section profile of the first surface of the optical lens comprises: determining the cross-section profile of the first surface of the optical lens such that, at least at a plurality of reference points x of the cross-section profile of the first surface, the cross-section profile has a tangent angle β with respect to the axis such that:

$$\frac{\sin\left(\tan^{-1}\left(\frac{x}{L_{chief}}\right) - \beta\right)}{\sin(\varphi - \beta)} = \frac{r_1}{r_2}$$

where $L_{chief}$ is a shortest distance between a first wavefront of the incident light beam at a lens plane of the optical lens and a second wavefront of a light beam outputting from the lens plane, φ is a phase difference between the first and second wavefronts, $r_1$ is a refractive index of a medium adjacent the optical lens, and $r_2$ is a refractive index of the optical lens.

In some embodiments, said determining the cross-section profile of the first surface of the optical lens comprises: determining the cross-section profile of the first surface as a piecewise-linear curve along the plurality of reference points, or a smooth curve fitting to the piecewise-linear curve.

In some embodiments, said determining the cross-section profile of the first surface of the optical lens comprises: using a high-order curve fitting method to determine the cross-section profile of the first surface as a smooth polynomial curve fitting to a piecewise-linear curve along the plurality of reference points.

In some embodiments, said determining the cross-section profile of the first surface of the optical lens comprises: partitioning a lens plane of the optical lens into N concentric lens-plane portions (N>1 is an integer) and partitioning the target plane into N concentric target-plane portions with equal widths; and determining the cross-section profile of the surface of the optical lens based on: (a) light rays passing through each lens-plane portion arriving into a corresponding target-plane portion, and (b) the N concentric lens-plane portions receiving equal light power, and correspondingly, the N concentric target-plane portions also receiving equal light power.

In some embodiments, said determining the cross-section profile of the surface of the optical lens comprises: determining widths of the lens-plane portions; determining wavefronts of the incident light beam at the lens plane and a light beam outputting from the lens plane, respectively; determining phase difference between the two wavefronts; determining bending angles along a reference line of the lens plane based on the phase difference; determining tangent lines for each point of the reference line; and determining the cross-section profile of the surface of the optical lens using the tangent lines.

According to one aspect of this disclosure, there is provided an optical lens structure comprising: one or more light-modification sets; each of the light-modification sets comprises: a polarizing beam-splitter for splitting an incident light beam into a plurality of intermediate light beams with orthogonal first polarization states, and a plurality of polarization-changing components each for changing the first polarization state of one of the plurality of intermediate light beams into a predefined second polarization state.

In some embodiments, the one or more light-modification sets comprise at least one metasurface set on a transparent substrate; the metasurface set comprises: a first metasurface as the polarizing beam-splitter on a first side of the substrate, and a plurality of second metasurfaces as the plurality of polarization-changing components on a second side of the substrate opposite to the first side.

In some embodiments, each of the light-modification sets comprises two polarization-changing components.

BRIEF DESCRIPTION OF THE DRAWINGS

For a more complete understanding of the disclosure, reference is made to the following description and accompanying drawings, in which:

FIGS. 9A to 9C show simulation results of the lens shown in FIG. 1 obtained using the ZEMAX® OpticStudio® software, wherein FIG. 9A shows the simulation result of an OSRAM® light emitting diode (LED) rayfile without using the lens shown in FIG. 1, FIG. 9B shows the simulation result of the OSRAM® LED rayfile with the use of the lens shown in FIG. 1, and FIG. 9C shows the comparison of the middle row of the simulation results with and without the lens;

FIGS. 10A to 10C show the test results of the lens shown in FIG. 1, wherein FIG. 10A shows the normalized irradiance on the target surface without using the lens shown in FIG. 1, FIG. 10B shows the normalized irradiance on the target surface with the use of the lens shown in FIG. 1, and FIG. 10C shows the comparison of the middle row of the test results with and without the lens shown in FIG. 1;

DETAILED DESCRIPTION

A. Optical Lens for Uniform Light-Distribution

Embodiments disclosed in this subsection related to an optical lens for distributing a cone of light emitted from a point light source towards a target plane with improved uniformity. The optical lens disclosed herein may be used in a grow-light system greenhouse lighting with improved performance.

In some embodiments, the lens comprises a smooth or piecewise-linear front surface for refracting or otherwise directing the light emitted from the light source (positioned on the rear side of the lens) towards the target plane with increased light uniformity.

In some embodiments, the front surface is symmetrical about the norm and has an "inwardly" curved central portion smoothly transitioning to an "outwardly" curved peripheral portion. More specifically, the cross-section profile of the front surface comprises a concave curve in the central portion thereof smoothly transitioning to a convex curve in the peripheral portion on each side of the central portion.

In some embodiments, the cross-section profile of the front surface may be determined using a ray-mapping method. More specifically, the ray-mapping method comprises:
  (i) partitioning the lens plane of the lens into N concentric lens-plane portions (N>1 is an integer) and partitioning the target plane into N concentric target-plane portions with equal widths.
  (ii) determining the cross-section profile of the front surface of the lens based on the following conditions:
  (a) light rays passing through each lens-plane portion arriving into the corresponding target-plane portion; and
  (b) the N concentric lens-plane portions receiving equal light power; correspondingly, the N concentric target-plane portions receiving equal light intensity.

The lens disclosed herein reserves the viewing angle of the point light source and provides an irradiance to the target plane with over 90% uniformity. Moreover, the lens disclosed herein has negligible Fresnel loss.

Figure 1:
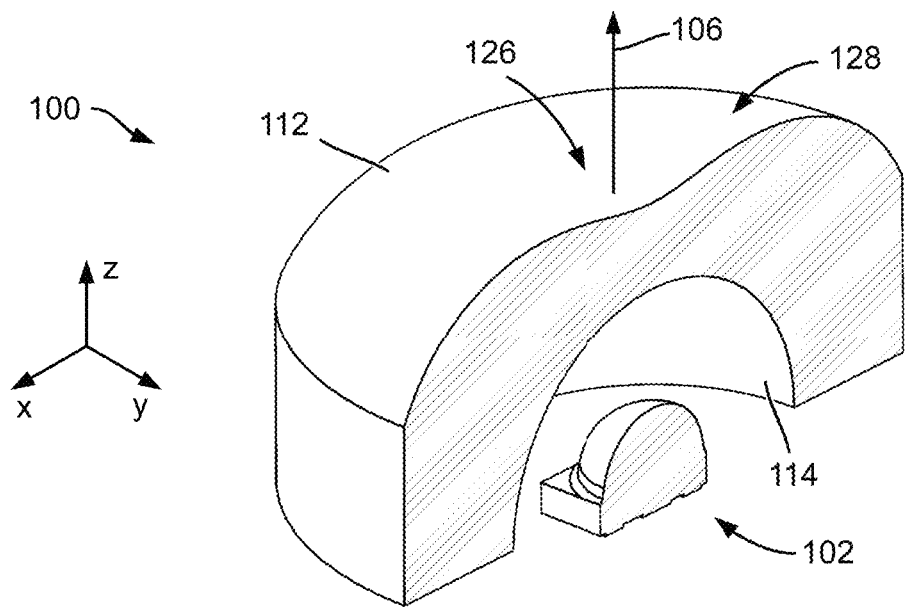
FIG. 1 is a perspective cross-sectional view of a lens and a point light source, according to some embodiments of this disclosure.
Figure 2:
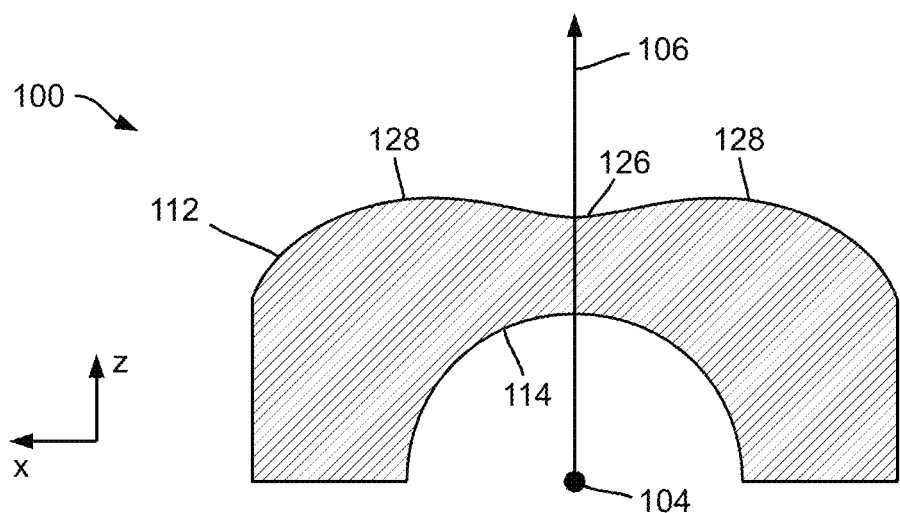
FIG. 2 is a cross-sectional view of the lens shown in FIG. 1.

Turning to FIGS. 1 and 2, a lens according to some embodiments of this disclosure is shown and is generally identified using reference numeral 100. As shown, the lens 100 is coupled to a light source 102 such as a light emitting diode (LED) positioned at an origin 104 of the lens 100 for providing a cone of light or irradiance with increased light uniformity on a target plane (not shown) perpendicular to the norm 106 of the lens 100 of at a distance therefrom.

In these embodiments, the lens 100 is made of a suitable transparent or translucent material such as glass, acrylic, and/or the like. For example, the lens 100 may be made of acrylic with small light absorption and high refractive index of about 1.489.

The lens 100 comprises a front or outer surface 112 distal to the light source 102 and a rear or inner surface 114 proximal thereto. The rear surface 114 is a concave, substantially semi-spherical surface symmetrical about the origin 104 such that light emitted from the light source 102 positioned at the original 104 may pass through the rear surface 114 substantially without refraction. As those skilled in the art will appreciate, a concave surface of an object (such as the rear surface 114 of the lens 100) is an "inwardly" curved surface wherein any line segment connecting two arbitrary points on the surface is outside the object except the two end points thereof). In contrary, a convex surface of an object is an "outwardly" curved surface wherein any line segment connecting two arbitrary points on the surface is inside the object.

The front surface 112 in these embodiments is a smooth surface for refracting or otherwise directing the light emitted from the light source 102 towards the target plane with increased light uniformity. In some embodiments, the term "smooth surface" or "smooth curve" (used below) refers to a surface or curve that the angle of a tangent at a point thereof and a predefined axis is a continuous angle with respective to the point (that is, the angle continuously change when the point is moving on the surface or curve). In some other embodiments, the term "smooth surface" or "smooth curve" follows the well-known scientific definitions thereof. For example, as defined in Wolfram MathWorld, "a smooth curve is a curve which is a smooth function, where the word "curve" is interpreted in the analytic geometry context. In particular, a smooth curve is a continuous map $f$ from a one-dimensional space to an n-dimensional space which on its domain has continuous derivatives up to a desired order." In some embodiments, the term "smooth surface" or "smooth curve" may refer to a "piecewise" smooth or an approximately smooth surface or curve that is an approximation (to a desired extent) of an above-defined smooth surface or curve.

As shown in FIGS. 1 and 2, the front surface 112 is symmetrical about the norm 106 and has an "inwardly" curved central portion 126 smoothly transitioning to an "outwardly" curved peripheral portion 128. More specifically, as shown in FIG. 2, the cross-section profile of the front surface 112 comprises a concave curve in the central portion 126 smoothly transitioning to a convex curve in the peripheral portion 128 on each side of the central portion 126.

In some embodiments, the shape of front surface 112 may be determined using a ray-mapping method.

In these embodiments, the ray-mapping method is based on the principle of energy conservation that energy is neither created nor destroyed. Therefore, optical energy emitted from a fixed cone of light would be received at the target plane.

Figure 3A:
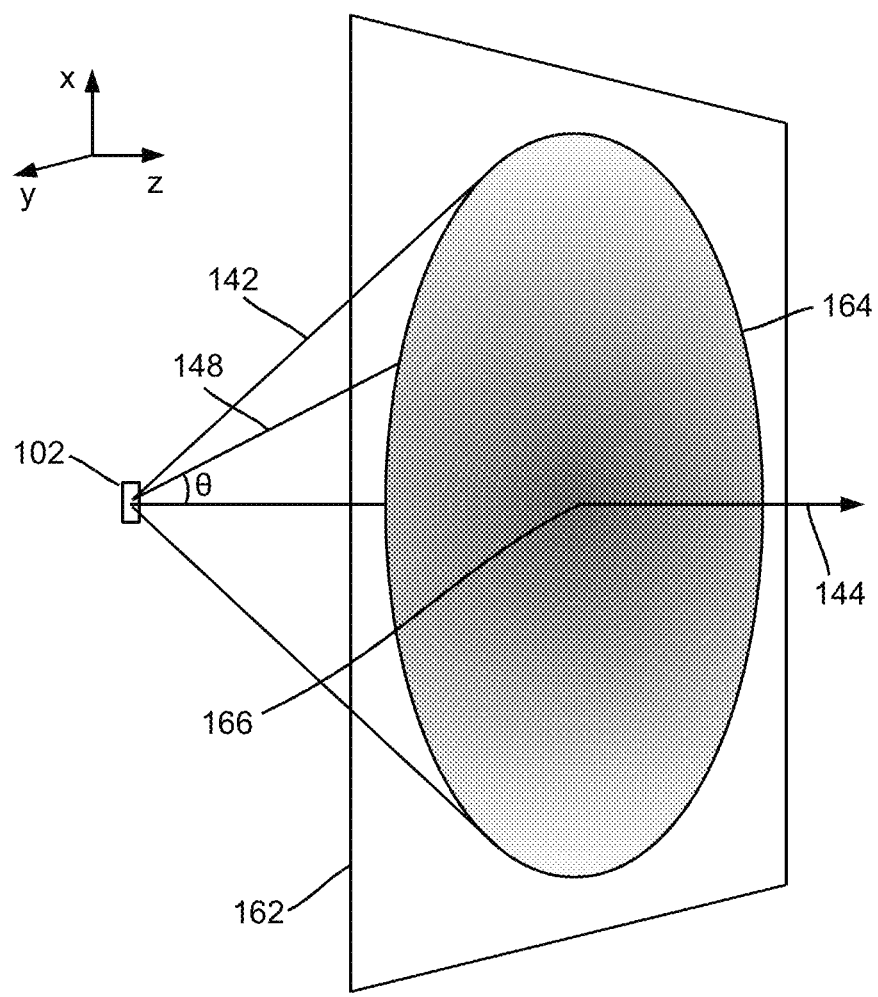
FIG. 3A is a schematic perspective view showing a light source emitting a cone of light to a target plane.

FIG. 3A shows a light source 102 emitting a cone of light 142 towards a target plane 162 thereby forming a projected light circle 164 thereon. The light cone 142 is symmetric about its norm 144, and the target plane 162 is perpendicular to the norm 144 of the light cone 142. For ease of description, a coordinate system is defined with the z-axis parallel to the norm 144 and the x-y plane parallel to the target plane 162. The intersection point 166 of the norm 144 and the target plane 162 is denoted the origin of the target plane 162 (which is also the center of the projected light circle 164).

In these embodiments, the distance between the light source 102 and the target plane 162 is sufficiently larger than the size of the light source 102, such that the size of the light source 102 may be ignored and thus the light source 102 may be consider as a point light-source that has Lambertian radiant intensity, that is, $$I_R \propto \cos\theta \tag{2}$$

where $I_R$ represents the radiant intensity of a light ray 148 of the light cone 142, θ is the angle between the light ray 148 and the norm 144, and ∝ represents "proportional".

Figure 3B:
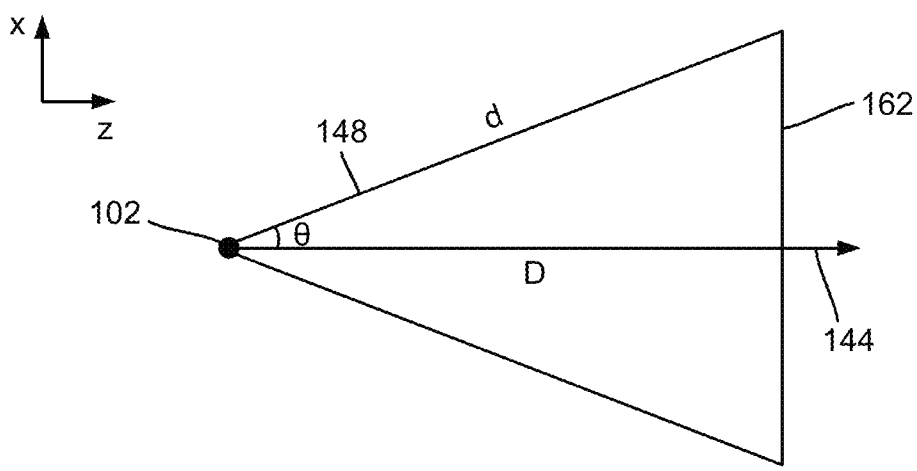
FIG. 3B is a schematic diagram showing the relationship of the light source, the cone of light, and the target plane shown in FIG. 3A.

As those skilled in the art will appreciate, a ray irradiance is related to the inverse square of the distanced (d=D/cos θ, D being the distance between the light source 102 and the target plane 162) that it travels from the source. Thus, as shown in FIG. 3B, the light intensity $I_T$ of the light ray 148 on the target plane 162 is $$I_T \propto \frac{I_R}{d^2} \propto (\cos\theta)^3. \tag{3}$$

Thus, the light intensity distribution on the target plane 162 is only related to the light-ray angle θ with respect to the norm 144, and as shown in FIG. 3, the target plane 162 receives light rays with higher light intensities at the center of the projected light circle 164 than at the peripheral thereof.

Figure 4A:
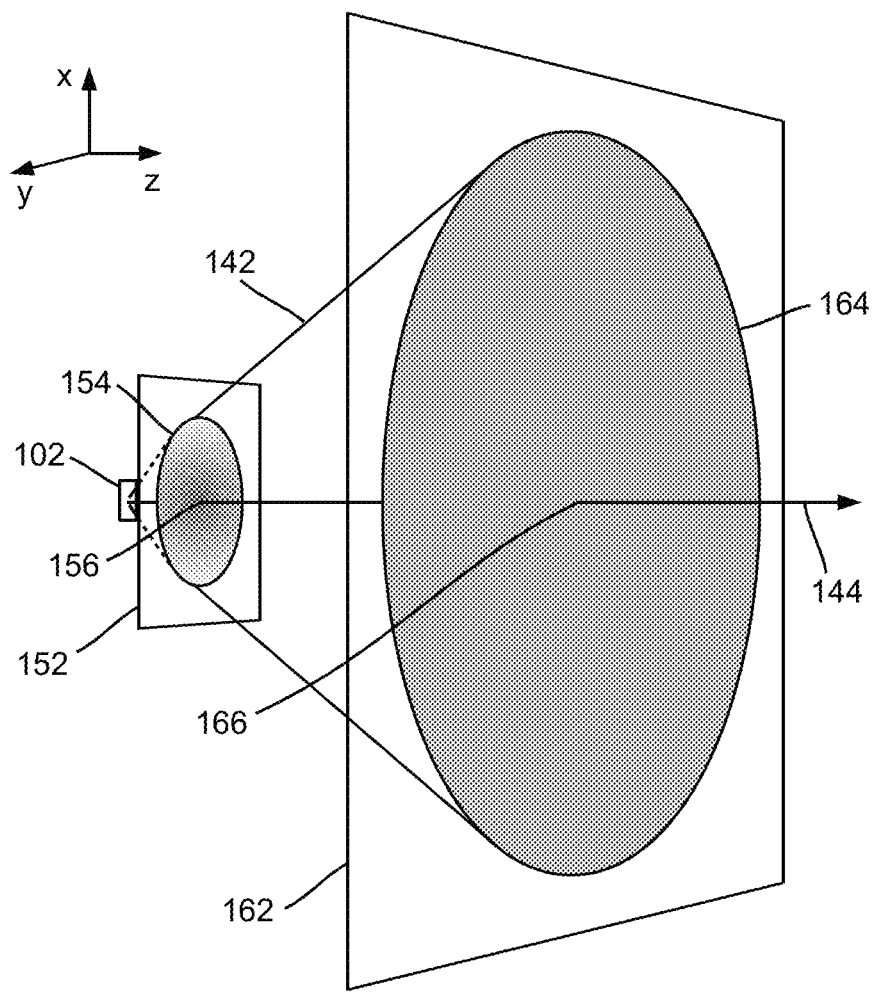
FIG. 4A is a schematic perspective view showing a light source emitting a cone of light through a plane (denoted a "lens plane") and arriving at the target plane.
Figure 4B:
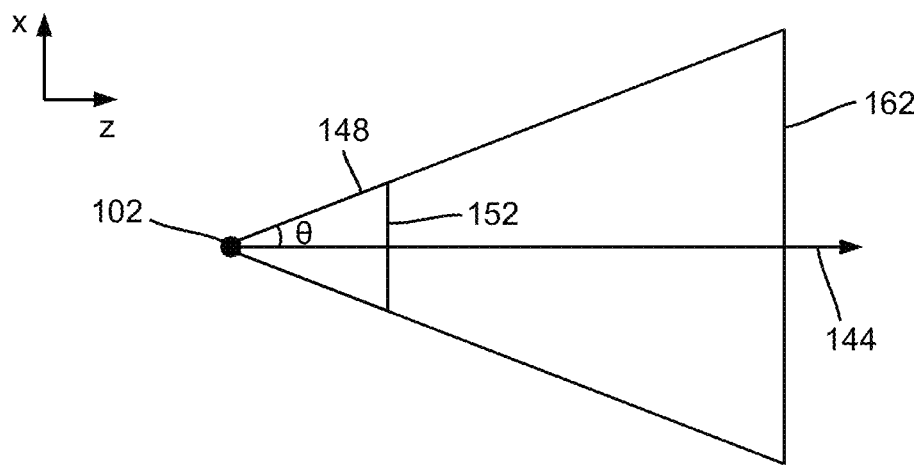
FIG. 4B is a schematic diagram showing the relationship of the light source, the cone of light, the lens plane, and the target plane shown in FIG. 4A.

In some embodiments, the front surface 112 of the lens 100 has a profile for modifying incident light from the light source 102 according to a light-modification function:

$$f_L(\theta) = k(\cos\theta)^{-3} \tag{4}$$

for a predefined angular range Θ<90° (that is, θ≤Θ<90°), where k is a constant. As shown in FIGS. 4A and 4B, the lens 100 may be positioned intermediate the light source 102 and the target plane 162 with the reference plane 152 of the lens 100 (denoted the "lens plane") perpendicular to the norm 144 and with a distance between the light source 102 and the lens plane 152 sufficiently larger than the size of the light source 102, such that the size of the light source 102 may be ignored and thus the light source 102 may be consider as a point light-source that has Lambertian radiant intensity. Then, the lens 100 may modify the light rays of the light cone 142 such that the light intensity is uniformly distributed in the projected light circle 164 on the target plane 162.

In various embodiments, the lens 100 may be implemented in any suitable methods. For example, FIGS. 5A to 5C shows a method for determining the profile of the front surface 112 of the lens 100.

Figure 5A:
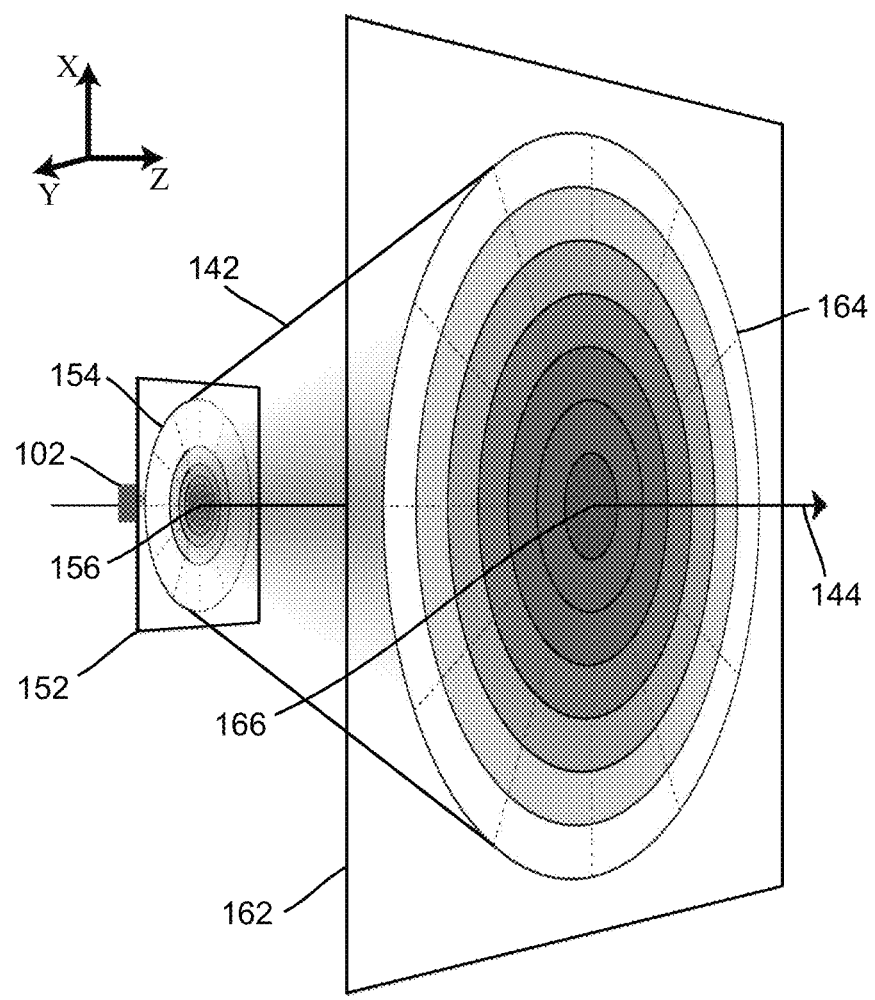
FIG. 5A is a schematic perspective view showing a light source emitting a cone of light through the lens plane and arriving at the target plane, according to some embodiments of this disclosure, wherein the lens plane and the target plane are partitioned into a plurality of concentric portions for determining the cross-section profile of the front surface of the lens shown in FIG. 1 using a ray-mapping method.
Figure 5B:
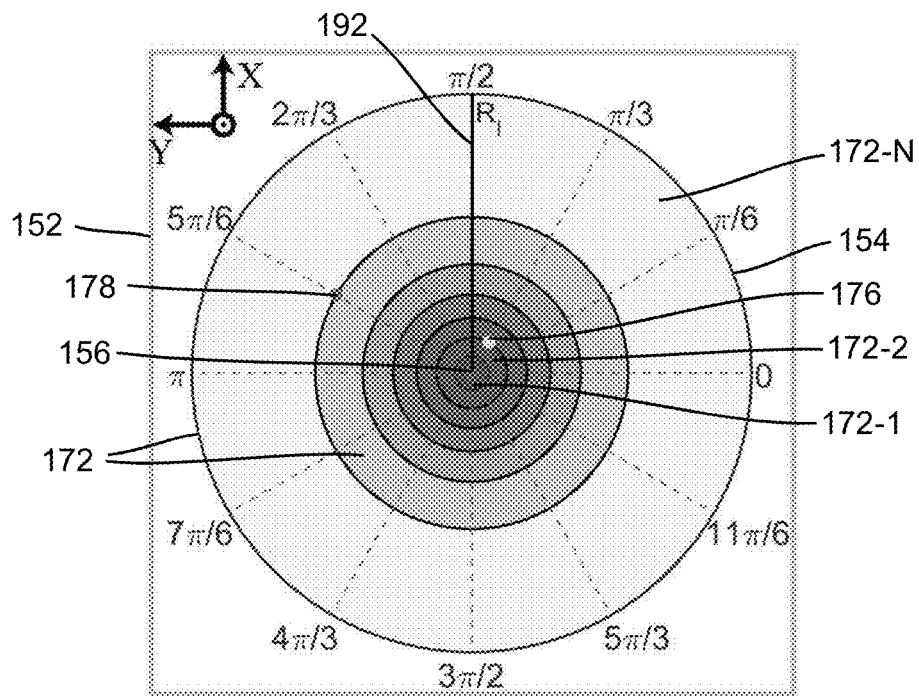
FIG. 5B is a schematic front view of the lens plane shown in FIG. 5A.
Figure 5C:
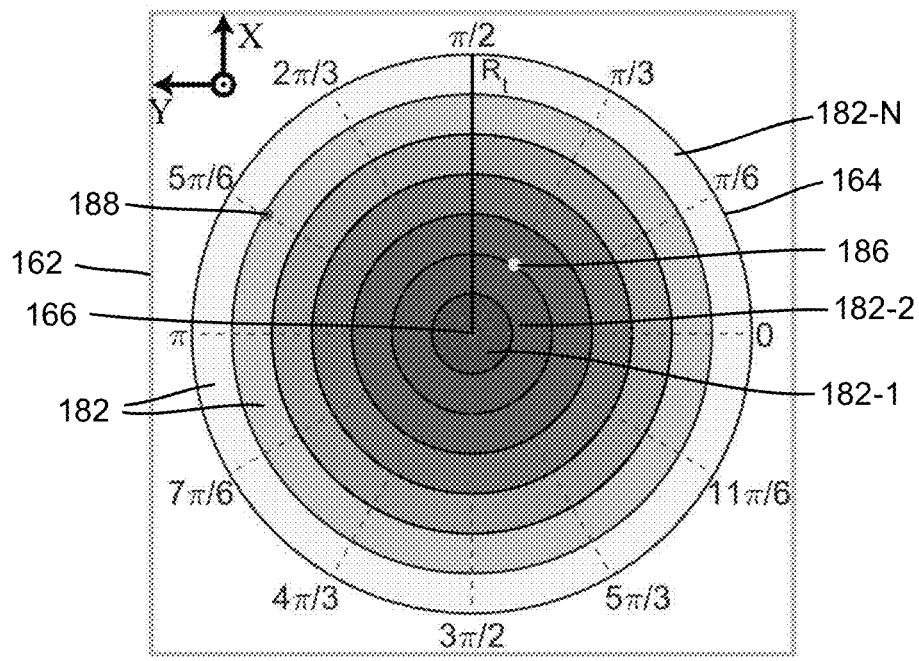
FIG. 5C is a schematic front view of the target plane shown in FIG. 5A.
Figure 5D:
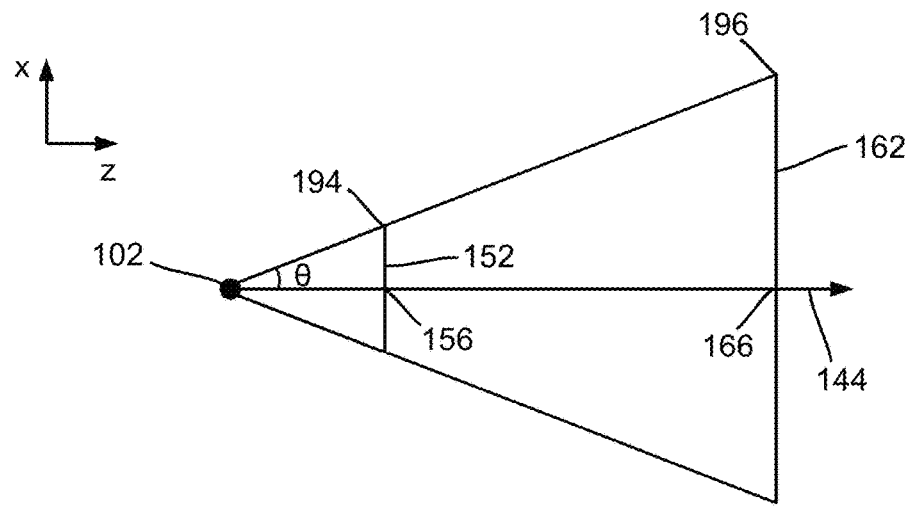
FIG. 5D is a schematic diagram showing the relationship of the light source, the cone of light, the lens plane, and the target plane shown in FIG. 5A.

As shown in FIGS. 5A and 5B, the light cone 142 projects a light circle 154 on the lens plane 152 and a light circle 164 on the target plane 162 (that is, the lens 100 does not change the size of the light circle 164 on the target plane 162 compared to that without using the lens 100). The projected light circle 154 of the lens plane 152 is partitioned into N (for example N=7 in this example) concentric lens-plane portions 172 including a circular lens-plane portion 172-1 at the center thereof and N−1 lens-plane rings 172-2, ..., 172-N concentrically about the circular central lens-plane portion 172-1. The widths $w_1, \ldots, w_N$ of the concentric lens-plane portions 172-1, ..., 172-N ($w_1$ being the radius of the central lens-plane portion 172-1, and $w_2, \ldots, w_N$ being the radial widths of the concentric lens-plane portions 172-2, ..., 172-N, respectively) are such that each lens-plane portion 172-n (1≤n≤N) receives equal or same light power.

Figure 6:
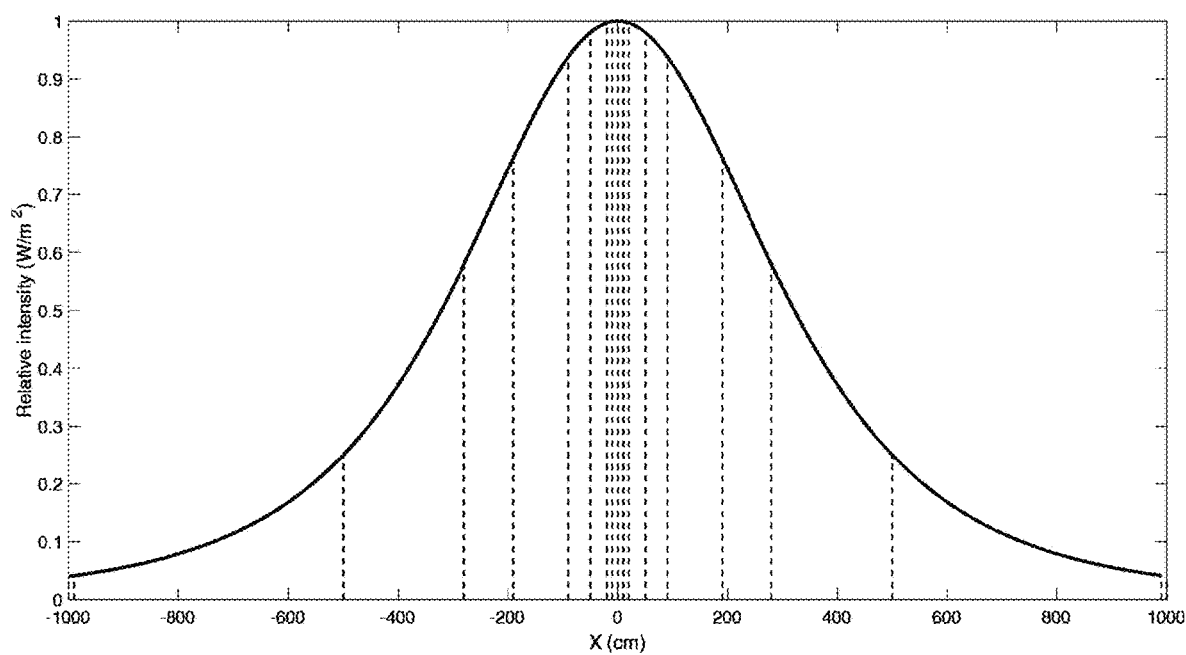
FIG. 6 shows the light intensity profile of a Gaussian light beam.

For a given light source 102, its light intensity profile on a projection plane such as the lens plane 152 is generally known. For example, FIG. 6 shows the light intensity profile of a Gaussian light-beam along a line. Thus, the widths $w_1, w_N$ of the N concentric lens-plane portions 172 may be determined based on the light intensity profile such that each lens-plane portion 172-n (1≤n≤N) receives equal or same light power. Clearly, $$w_1 \leq w_2 \leq \ldots \leq w_N \tag{5}$$

Referring back to FIGS. 5A and 5C, the projected light circle 164 of the target plane 162 is partitioned into N concentric target-plane portions 182 with equal widths. More specifically, the N concentric target-plane portions 182 include a circular target-plane portion 182-1 at the center thereof and N−1 target-plane rings 182-2, ..., 182-N concentrically about the circular central target-plane portion 182-1 wherein the radius of the circular central target-plane portion 182-1 equals to the radial width of each of the target-plane rings 182-2, ..., 182-N.

In the following, the profile of the front surface 112 of the lens 100 is determined such that the light rays going through each lens-plane portion 172-n (1≤n≤N) incident into the corresponding target-plane portion 182-n such that each target-plane portion 182-n receives the same light intensity. Note that a light ray going through a point of the lens plane 152 (for example, the point 176 or 178 in FIG. 5B) incidents at a corresponding point of the target plane 162 (for example, the point 186 or 188 in FIG. 5B) of the same polar angle with respect to an axis on the x-y plane (for example, the x-axis) but with different radial position with respect to the origin 156 or 166 thereof.

Since the light source 102 and the lens 100 are azimuthally symmetric about the norm 144, it is sufficient to calculate ray-mapping for the points on a sample or reference line crossing the origin on the x-y plane (such as the line 192 parallel to the x-axis).

Figure 7A:
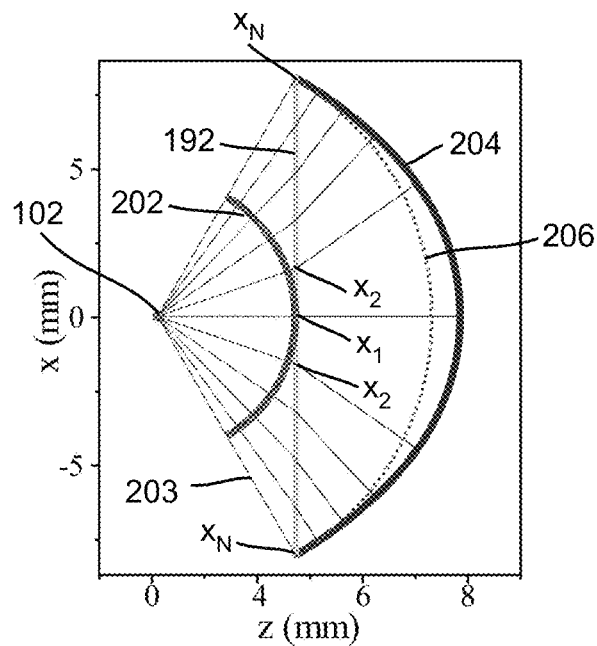
FIG. 7A is a schematic diagram showing the incident beam to the lens plane shown in FIG. 5A, the output beam therefrom, and their wavefronts for calculating phase shift.

For ease of description, the light source 102 herein is a zero-etendue source and the light cone 142 is a coherent beam. With above-described information of ray-mapping and the position of each ray on the target plane 164 after applying the ray-mapping, the wavefronts 202 and 204 of the incident beam and the output beam may be obtained, wherein the incident beam is the light cone 142 incident to the lens plane 152 of the lens 100, and the output beam is the light cone 142 coming out of the lens plane 152 thereof (that is, after the light cone 142 is modified by the lens 100). FIG. 7A shows the wavefronts 202 and 204 of the incident beam and the output beam, respectively. The dashed curve 206 shows the wavefront coming out of the lens plane 152 if the lens 100 is not positioned at the lens plane 152 (that is, the wavefront of the light cone 142 if not modified by the lens 100).

Figure 7B:
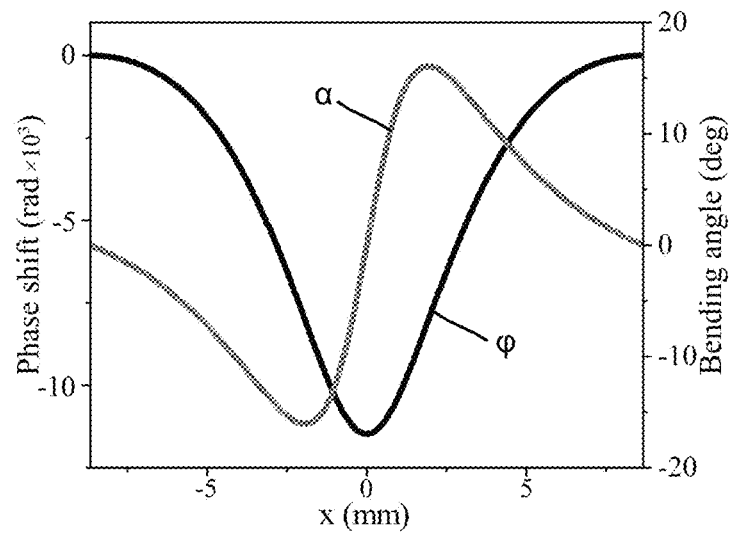
FIG. 7B is a plot showing the required phase shift based on wavefront tailoring for each point of the lens line and the related bending angle for each point of lens line.

The phase difference between the two wavefronts 202 and 204 is:

$$\varphi = \frac{2\pi}{\lambda}(L_{chief} - L_{sl} - L_{lt}) \tag{6}$$

where $L_{chief}$, $L_{sl}$ and $L_{lt}$ are the chief ray optical path length (that is, the shortest distance 203 between the two wavefronts 202 and 204), the point source-to-lens optical path lengths (that is, the optical path length that each ray travels from the wavefront 202 to the reference line 192), and the lens-to-target point optical path length (that is, the distance that each ray travels from the reference line 192 to the wavefront 204), respectively, and λ is the mean wavelength of the light beam. Thus, φ is the required phase shift of the light cone 142 to be applied by the lens 100. FIG. 7B is a plot showing the phase shift φ for each point of the reference line 192 on the lens plane 152 and the corresponding bending angle α. As shown, φ is a function of the position x of the points on the reference line 192. In these embodiments, each lens-plane portion 172-$n$ (1≤n≤1V) corresponds to a reference point $x_N$ on the reference line 192 (for example, the line extending from the light source position 102 through the point $x_N$ crosses the radial center of the corresponding lens-plane portion 172-$n$. The values of φ at each point $x_N$ (denoted $\varphi_n$) may be determined numerically using Equation (6).

The bending angle α along the reference line 192 may be calculated based on the phase shift φ in Equation (6) as follows:

$$\frac{d\varphi}{dx} = \frac{2\pi}{\lambda}\sin\alpha \quad (7)$$

$$\alpha = \sin^{-1}\left(\frac{d\varphi}{dx} \times \frac{\lambda}{2\pi}\right) \quad (8)$$

where $\sin^{-1}(\ )$ represent the inverse of $\sin(\ )$. By using Equation (8), the bending angle α at each point $x_n$ (denoted $\alpha_n$) may be calculated.

After calculating the bending angle α (or more specifically, the bending angle $\alpha_n$ at each point $x_n$), the Snell's law may be used to calculate the tangent angle β (with respect to an axis (such as the x-axis) perpendicular to the line (that is, the norm) between the light source 102 and the center 166 of the of the projected light circle 164) for each point x of the reference line 192 on the lens plane 152 as:

$$\frac{\sin\left(\tan^{-1}\left(\frac{x}{L_{chief}}\right) - \beta\right)}{\sin(\varphi - \beta)} = \frac{r_1}{r_2} \quad (9)$$

where $r_1$ is the refractive index of the medium (for example, air) adjacent the lens 100, and $r_2$ is the refractive index of the lens 100. By using Equation (9), the tangent angle $\beta_n$ at each point $x_n$ may be calculated.

Figure 8:
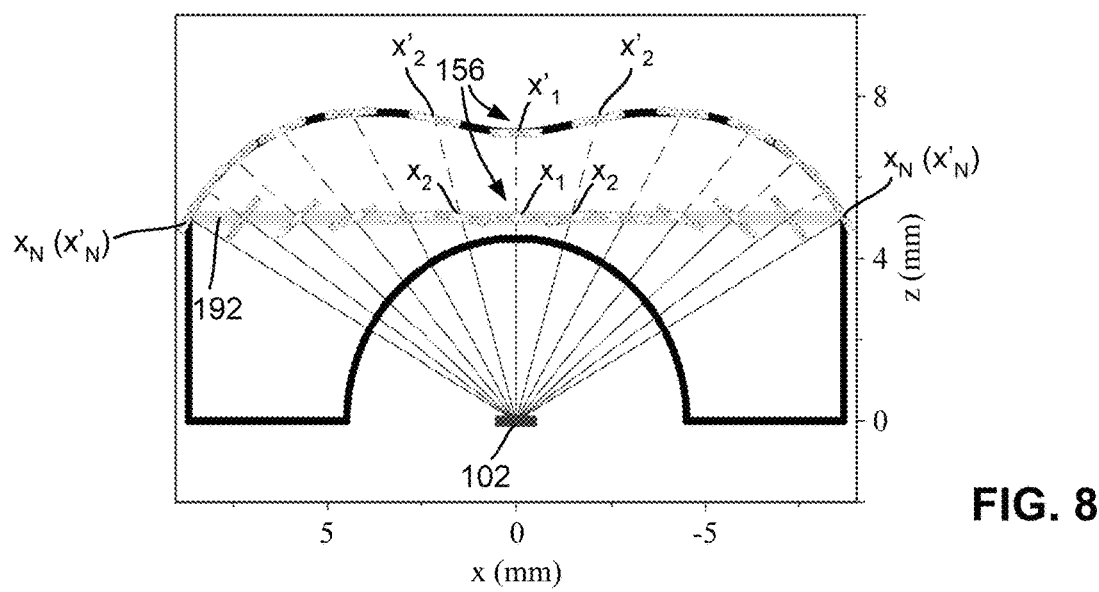
FIG. 8 is a schematic diagram showing the cross-section profile of the front surface of the lens shown in FIG. 1 obtained using the ray-mapping method.

Referring to FIG. 8, the cross-section profile of the front surface 112 of the lens 100 may be obtained by combining the angles of the tangent lines (that is, the tangent angles $\beta_n$) such that the cross-section profile starts from the distal end of the reference line 192 (that is, the point $x_N$ on the reference line 192) and has a tangent angle $\beta_n$ at each point $x_n'$ intersecting the line from the light source position 102 extending through the corresponding point $x_n$ on the reference line 192 until reaching the center 156 to complete half of the cross-section profile. The other half of the cross-section profile may be obtained in a similar manner. Then, the profile of the front surface 112 of the lens 100 may be obtained from the cross-section profile based on the azimuthal symmetry described above.

The obtained cross-section profile of the lens 100 is a piecewise-linear curve on the x-z plane and having a tangent angle at each point $x_n'$ determined by Equation (9). In some embodiments, a high-order curve fitting method is used to fit a smooth polynomial curve to the piecewise-linear curve obtained as above, which is used for obtaining the surface profile of the lens 100.

In some embodiments, with a sufficiently large N, the obtained piecewise linear curve is substantially a smooth curve.

Figures 9A, 9B:
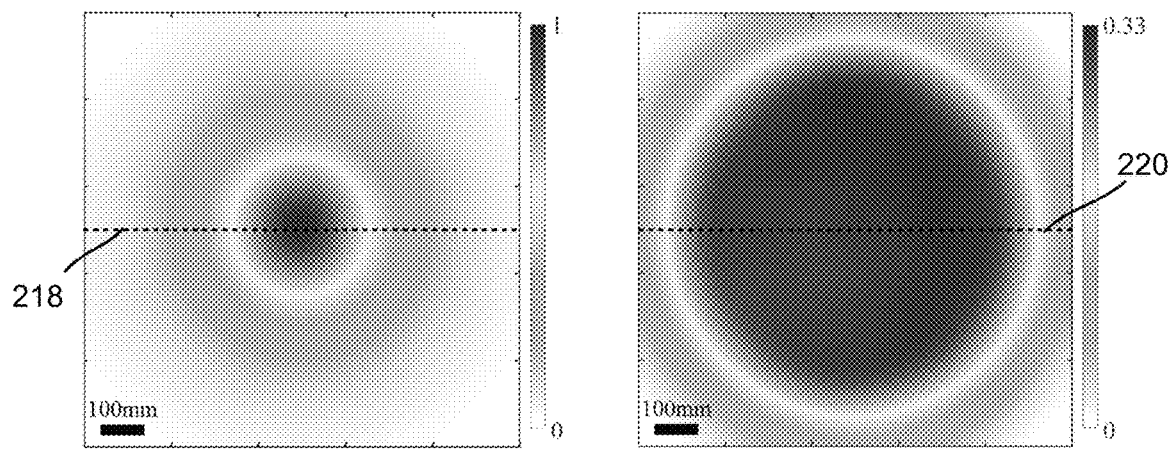
Figure 9C:
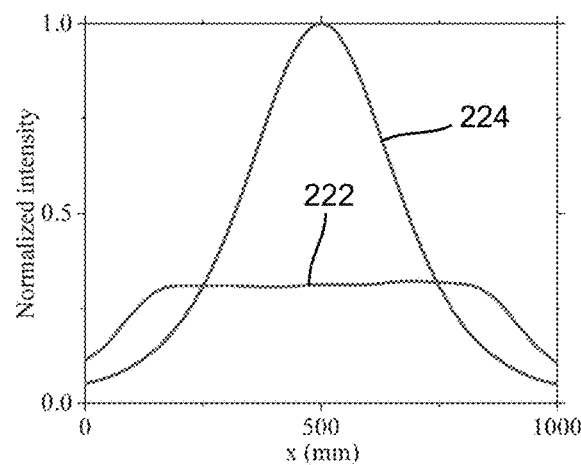

FIGS. 9A to 9C show the simulation results using ZEMAX® OpticStudio® (ZEMAX and OPTICSTUDIO are registered trademarks of Zemax, LLC of Kirkland, WA, USA), for a rayfile of OSRAM® hyper-red LED (OSLON® Square, GH CSSRM4.24) (OSLON and OSRAM are registered trademarks of OSRAM GmbH of Munich, Germany) having five (5) million rays and a designed lens. In the simulation, the distance between the source and the target plane with and without the lens is 25 centimeters (cm).

FIG. 9A shows the ZEMAX simulation result for OSRAM LED rayfile without the lens 100; FIG. 9B shows the simulation result for OSRAM LED rayfile with the lens 100; FIG. 9C compares the middle rows 218 (in FIG. 9A) and 220 (in FIG. 9B) of the simulation results with the lens 100 (curve 222) and without the lens 100 (curve 224). Clearly, by using the lens 100, the uniformity of the light intensity on the target plane is significantly improved. More specifically, light-intensity uniformity on the target plane 162 is 95.1% for a 60° cone of light when using the lens 100. On the other hand, the same cone of light only achieves 11.2% uniformity on the target plane 162 when without using the lens 100. Also, the power that is received in the target plane 162 with and without the lens 100 is the same amount.

Figure 10A:
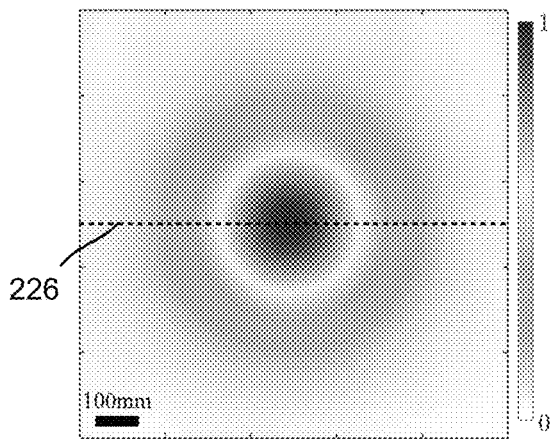

FIGS. 10A to 9F show the testing results of a single LED with a lens 100. In the testing, the distance between the source and the target plane with and without the lens is 25 centimeters (cm).

Figure 10B:
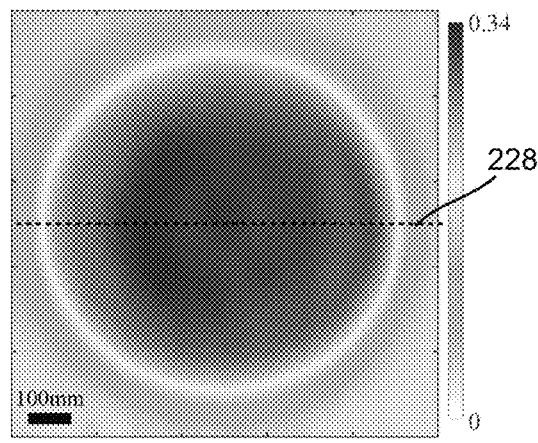
Figure 10C:
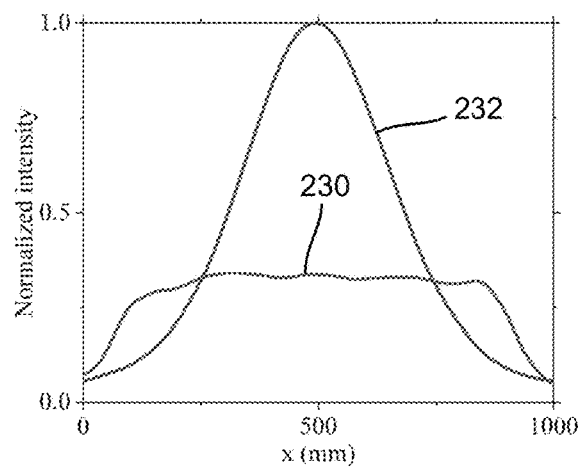

FIG. 10A shows the normalized light intensity without the lens 100; FIG. 10B shows the normalized light intensity when the lens 100 is used; and FIG. 10C compares the middle rows 226 (in FIG. 10A) and 228 (in FIG. 10B) of the testing results with the lens 100 (curve 230) and without the lens 100 (curve 232). Clearly, by using the lens 100, the uniformity of the light intensity (90.2%) on the target plane is significantly improved. It is noted that the light-intensity uniformity achieved in the testing is lower than the simulation result due to manufacturing errors of the lens 100.

By comparing the simulation results and the experimental results, it is noted that the optical power received on the target plane 162 in testing is about 7% less than that in the simulation, due to the absorption of the lens material. Moreover, as can be seen from FIGS. 9A to 10C, the maximum difference between the incident rays and the norm of the lens surface at the intersection point is less than 28° and therefore the Fresnel loss of the lens 100 may be ignored.

Figure 11A:
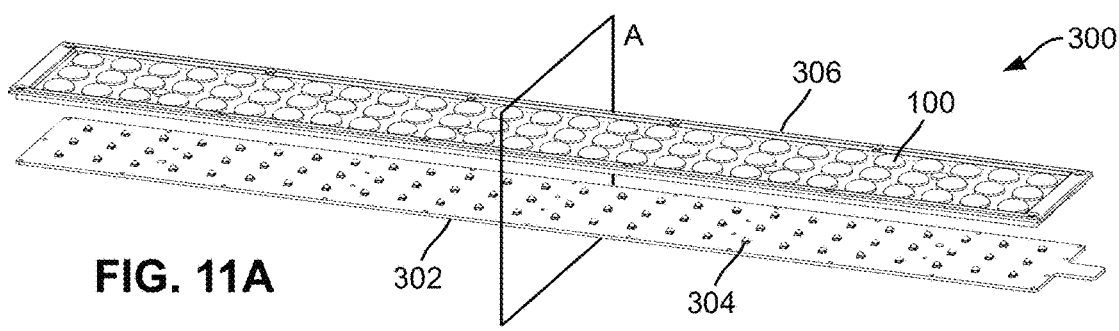
FIG. 11A is a perspective view of a light system having a plurality of LEDs and a plurality of corresponding lenses shown in FIG. 1.
Figure 11B:
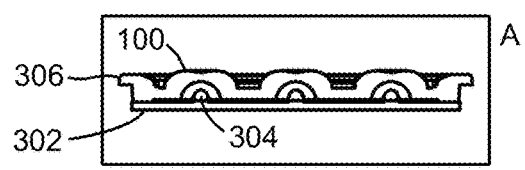
FIG. 11B is a cross-section view of the light system shown in FIG. 11A along the cross-sectional plane A.

FIGS. 11A and 11B show a LED light system 300 having a plurality of LEDs and a plurality of corresponding lenses 100. As shown, the LED light system 300 comprises a LED printed circuit board (PCB) 302 having a plurality of LEDs 304, and a lens panel 306 having a plurality of circular lens 100 as described above at locations corresponding to the LEDs 304. The maximum thickness of the lens 100 is 5.4 millimeters (mm) and the minimum thickness is 2.2 mm. The overall lens panel volume is 120,000 mm³.

Figure 11C:
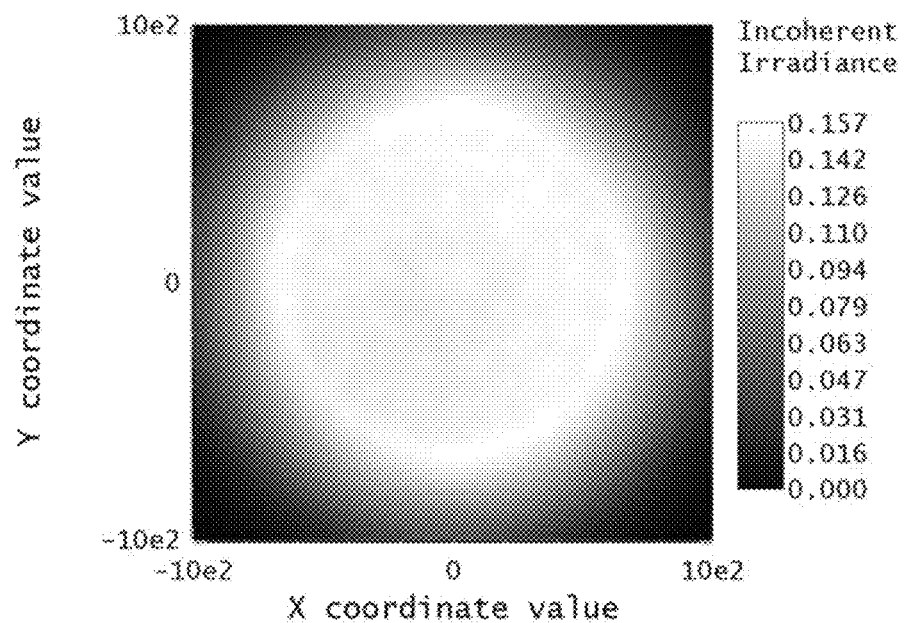
FIG. 11C shows the light intensity of the light system shown in FIG. 11A on a two (2) meters (m) by 2 m target plane when the distance between the light source and the target plane is 0.5 m.
Figure 11D:
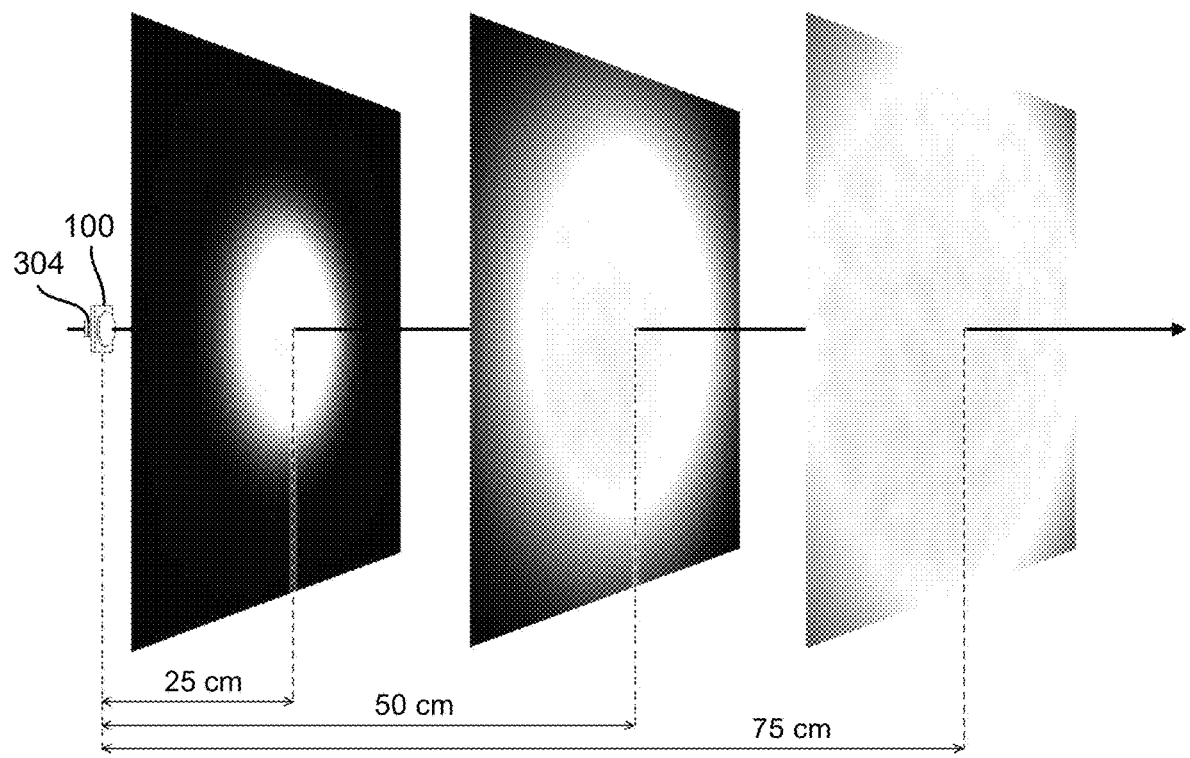
FIG. 11D shows the irradiances of the light system shown in FIG. 11A on the target plane at three different distances (25 cm, 50 cm, and 75 cm) from the LED.

Each LED 304 and its corresponding lens 100 provide a wide, circular-shape, uniform light-intensity area on the plant canopy plane. FIG. 11C shows the light intensity on a two (2) meters (m) by 2 m target plane when the distance between the light source and the target plane is 0.5 m. FIG.

11D shows the irradiances on the target plane at three different distances (25 cm, 50 cm, and 75 cm) from the LED 304.

In this example, the viewing angle (measured as the full width at half maximum (FWHM)) of the lens 100 is 130° which is higher than the initial viewing angle of the LED 304. The highest uniformity in the uniform light-intensity area is 94%. The coverage area for 0.5 m distance from the source with 90% uniformity is 1,056,800 square mm², with 69.2% of the initial radiant power inside thereof.

Figure 12:
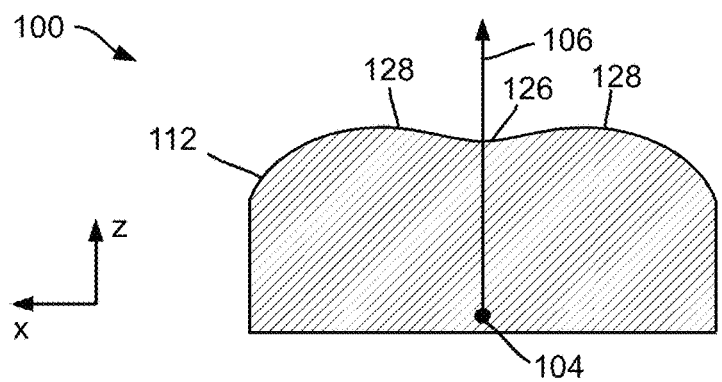
FIG. 12 is a cross-sectional view of a lens and a point light source, according to some embodiments of this disclosure.

In above embodiments, the lens 100 has a semi-spherical rear or inner surface adjacent the light source 104. In some embodiments as shown in FIG. 12, the light source 104 may be embedded or otherwise integrated in the lens 100. Therefore, the lens 100 in these embodiments does not comprise any rear surface adjacent the light source 104.

In some embodiments, the lens 100 may have square shape (that is, a cross-section of the lens 100 along a plane parallel to the norm is a square shape). In these embodiments, the front surface of the lens 100 may be formed by first determining the cross-section profile as described above, then applying the cross-section profile to the x and y directions (instead of "rotating" the cross-section profile by 360° in above embodiments). The resulting square lens is not azimuthal symmetrical.

Figure 13A:
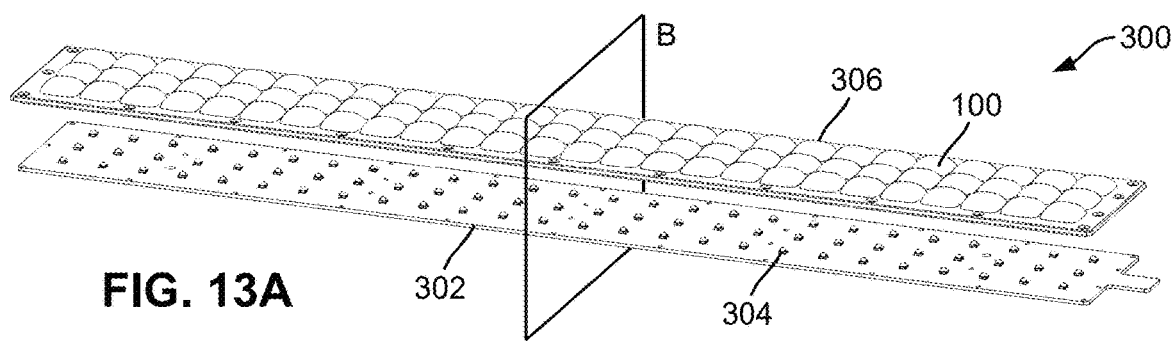
FIG. 13A is a perspective view of a light system having a plurality of LEDs and a plurality of corresponding, square-shape lenses, according to some embodiments of this disclosure.
Figure 13B:
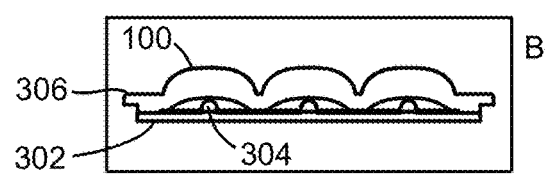
FIG. 13B is a cross-section view of the light system shown in FIG. 13A along the cross-sectional plane B.

FIGS. 13A and 13B show a LED light system 300 in these embodiments, which is similar to that shown in FIGS. 11A and 11B except that the lenses 100 in this example are square lenses. The maximum thickness of the lens 100 is 8.1 mm and the minimum thickness is 3.1 mm. The overall lens panel volume is 160,000 mm³.

Figure 13C:
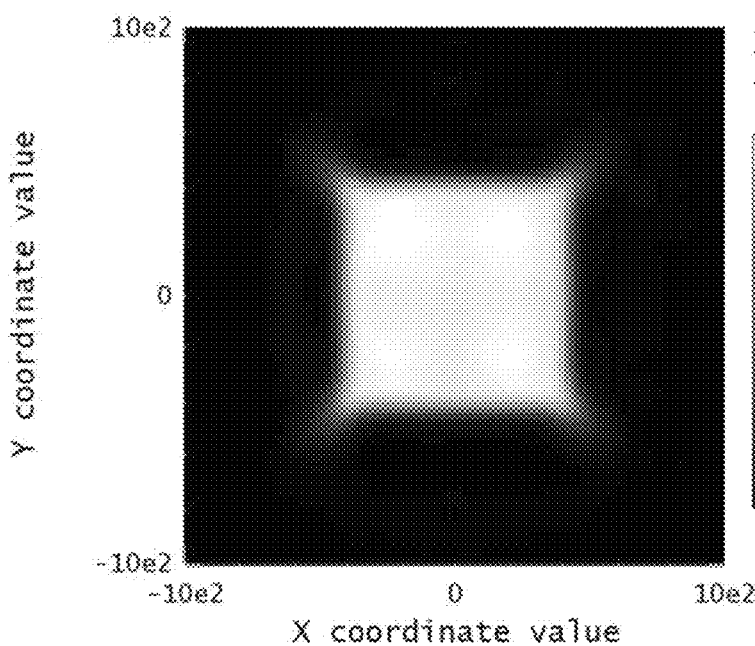
FIG. 13C shows the light intensity of the light system shown in FIG. 13A on a 2 m by 2 m target plane when the distance between the light source and the target plane is 0.5 m.
Figure 13D:
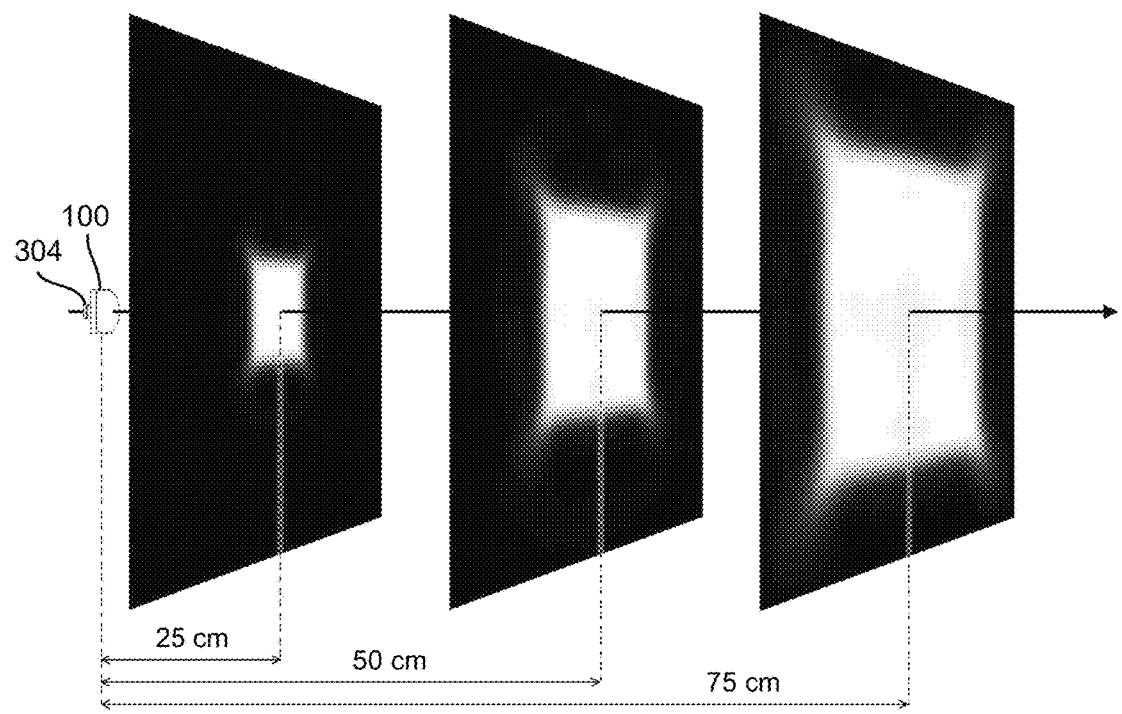
FIG. 13D shows the irradiances of the light system shown in FIG. 13A on the target plane at three different distances (25 cm, 50 cm, and 75 cm) from the LED.

Each LED 304 and its corresponding lens 100 provide a square-shape, uniform light-intensity area on the plant canopy plane. FIG. 13C shows the light intensity on a 2 m by 2 m target plane when the distance between the light source and the target plane is 0.5 m. FIG. 13D shows the irradiances on the target plane at three different distances (25 cm, 50 cm, and 75 cm) from the LED 304.

In this example, the viewing angle (measured as the FWHM) of the lens 100 is 93°. Although such a viewing angle is smaller than that of the LED 304, the lens 100 focuses the light uniformly into the target area. The highest uniformity in the uniform light-intensity area is 90.2%. The coverage area for 0.5 m distance from the source with 90% uniformity is 45,996 square mm², with 62.1% of the initial radiant power inside thereof.

In some embodiments, the lens 100 (denoted "outer-flat surface (OFS) lens") may have a flat front or outer surface and a circular rear or inner surface determined using the method described above and with the consideration of light refraction on the flat front surface.

Figure 14A:
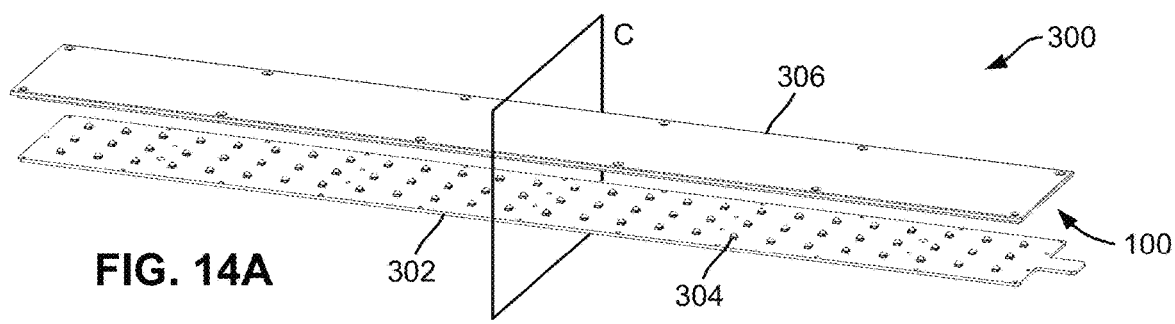
FIG. 14A is a perspective view of a light system having a plurality of LEDs and a plurality of corresponding, outer-flat surface (OFS) lenses, according to some embodiments of this disclosure.
Figure 14B:
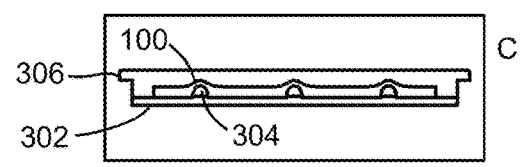
FIG. 14B is a cross-section view of the light system shown in FIG. 14A along the cross-sectional plane C.

FIGS. 14A and 14B show a LED light system 300 in these embodiments, which is similar to that shown in FIGS. 11A and 11B except that the lenses 100 in this example are OFS lenses. The maximum thickness of the lens 100 is 4.1 mm and the minimum thickness is 2 mm. The overall lens panel volume is 110,000 mm³.

Figure 14C:
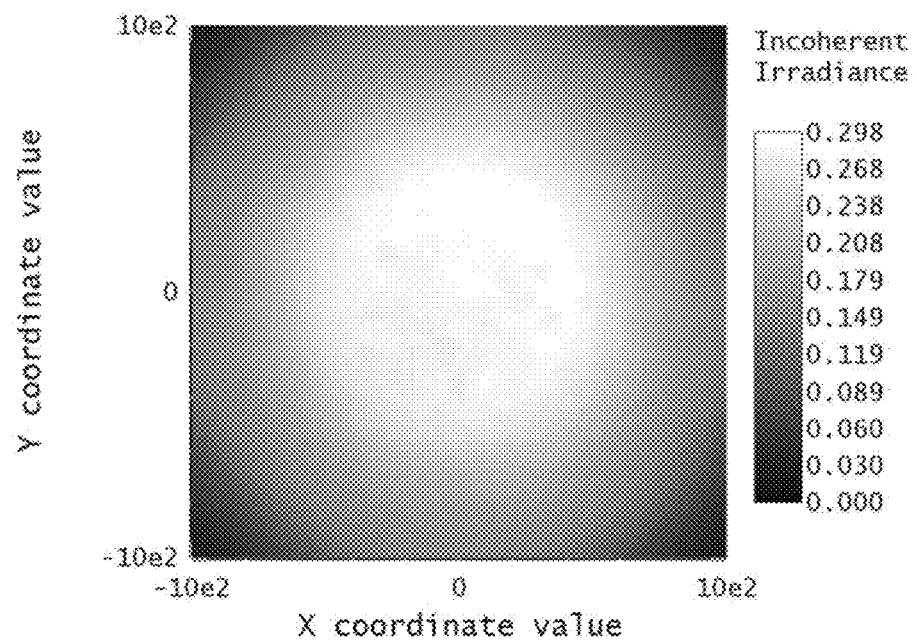
FIG. 14C shows the light intensity of the light system shown in FIG. 14A on a 2 m by 2 m target plane when the distance between the light source and the target plane is 0.5 m.
Figure 14D:
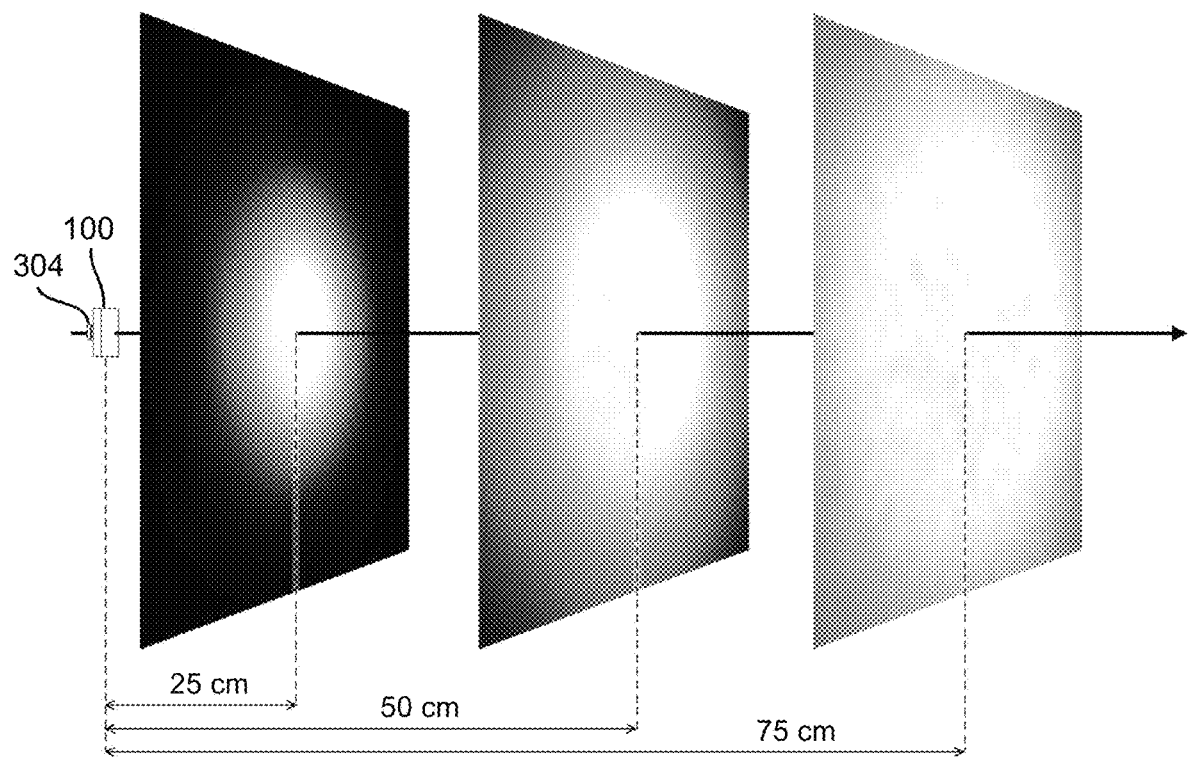
FIG. 14D shows the light intensity of the light system shown in FIG. 14A on the target plane at three different distances (25 cm, 50 cm, and 75 cm) from the LED.

Each LED 304 and its corresponding lens 100 provide a circular-shape, uniform light-intensity area on the plant canopy plane. FIG. 14C shows the light intensity on a 2 m by 2 m target plane when the distance between the light source and the target plane is 0.5 m. FIG. 14D shows the light intensity on the target plane at three different distances (25 cm, 50 cm, and 75 cm) from the LED 304.

In this example, the viewing angle (measured as the FWHM) of the lens 100 is 120° which is as same as the viewing angle of the LED 304. The highest uniformity in the uniform light-intensity area is 91.4%. The coverage area for 0.5 m distance from the source with 90% uniformity is 1,056,800 square mm², with 24.9% of the initial radiant power inside thereof.

Figure 15:
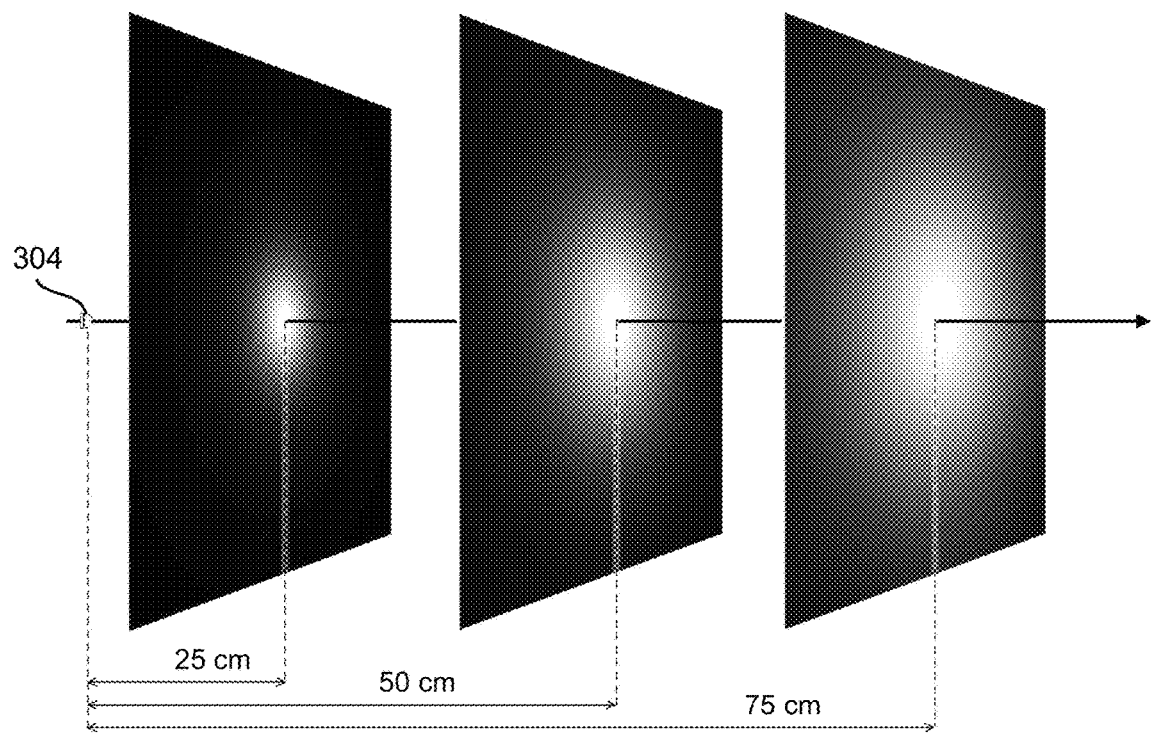
FIG. 15 shows the light intensity of a LED (without using any lens) on a 2 m by 2 m target plane when the distance between the light source and the target plane is 25 cm, 50 cm, or 75 cm.

For comparison, FIG. 15 shows the light intensity of a LED 304 (without using any lens) on a 2 m by 2 m target plane when the distance between the light source and the target plane is 25 cm, 50 cm, or 75 cm.

Table 1 below shows the comparison of the LED light systems having square lens, circular lens, OFS lens, and without lens.

TABLE 1

COMPARISON OF THE LED LIGHT SYSTEMS HAVING SQUARE LENS, CIRCULAR LENS, OFS LENS, AND WITHOUT LENS

|  | Square lens | Circular lens | OFS lens | Without Lens |
| --- | --- | --- | --- | --- |
| Area having 90% light-intensity uniformity (mm²) | 291,600 | 1,056,800 | 502,600 | 45,996 |
| Max intensity (W/m²) | 2.13 | 0.574 | 0.468 | 1.19 |
| Relative power in 90% uniform area (mW) | 62.1% | 69.2% | 24.9% | 5.1% |
| Max thickness (mm) | 8.1 | 5.4 | 4.1 | NA |
| Minimum thickness (mm) | 3.1 | 2.2 | 2 | NA |
| Lens panel volume (mm³) | 160,000 | 120,000 | 110,000 | NA |
| Minimum diameter of each lens (mm) | 18.6 | 14.3 | 17.3 | 3 |
| Maximum LED cap to outer surface distance (mm) | 10.3 | 6.2 | 6.3 | NA |

Although in above embodiments, LED is used as the light source, in some other embodiments, any other suitable light source may be used.

B. Optical Lens Structure for Light-Polarization Conversion

In some embodiments, a high-efficiency optical structure may be used for converting randomly polarized light and/or non-polarized light into a desired polarization state. Such a high-efficiency optical lens structure may be useful for greenhouse lighting systems.

Recent improvement in the electromagnetic power of LEDs leads to the creation of a new field of lighting systems, called solid-state lighting (SSL). Different to conventional lighting sources, SSL lighting sources convert electrical energy directly into electromagnetic energy, which leads to an increased degree of efficiency and an extended lifespan.

With the decreasing prices of LEDs, the conventional lighting sources such as high-pressure sodium (HPS) and incandescent lightbulbs will be replaced with SSL lighting sources.

In grow-light area, polarized light may significantly increase the photosynthesis efficiency. Specifically, right-handed circularly polarized (RCP) light may increase photosynthesis rates compared to non-polarized light. However, the output of typical LEDs are usually non-polarized. It is also challenging to convert non-polarized light of LEDs into polarized light with high efficiency. Furthermore, there is a lack of compact, small form-factor optical components capable of converting non-polarized light (such as LEDs) into a desired polarization state (including RCP).

Figure 16:
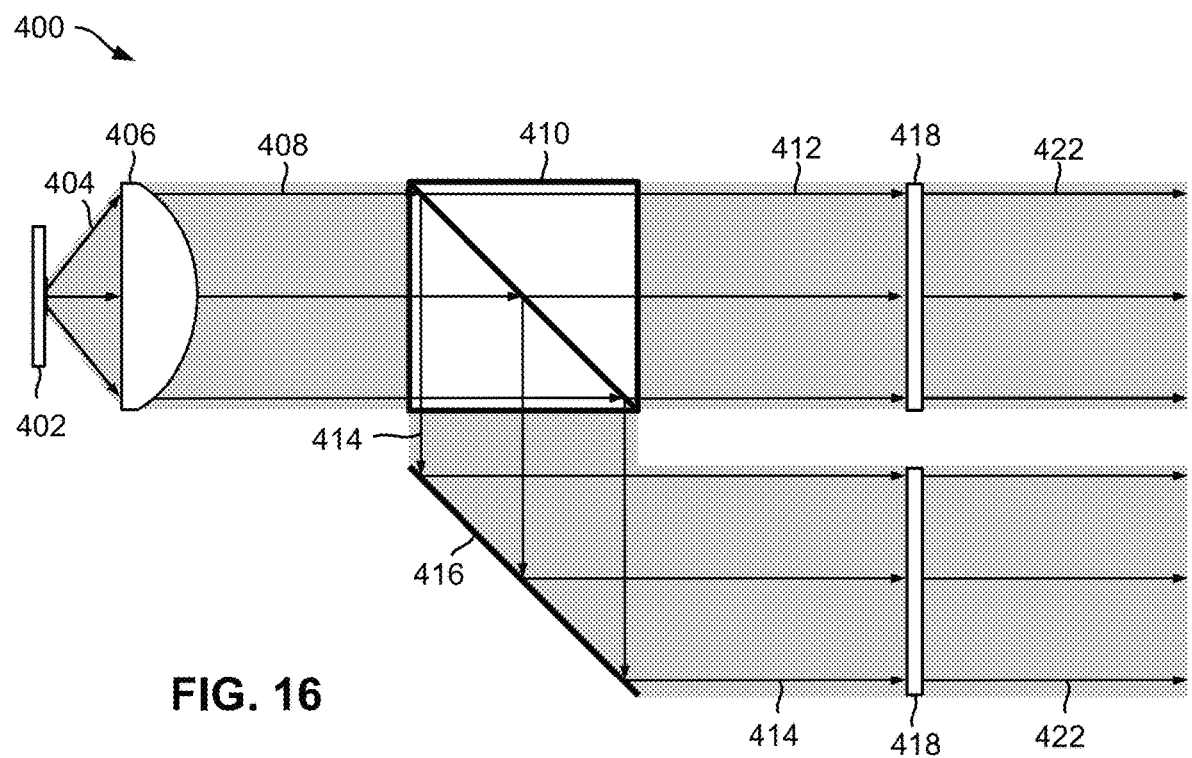
FIG. 16 is a schematic diagram showing an optical lens structure for converting non-polarized light (such as LEDs) into a desired polarization state, according to some embodiments of this disclosure.

FIG. 16 is a schematic diagram showing an optical lens structure 400 for converting non-polarized light (such as LEDs) into a desired polarization state, according to some embodiments of this disclosure. As shown, the optical lens structure 400 comprises a light source 402 such as a light panel for emitting a non-polarized diverging light beam 404 (which has diverging light rays). A collimating lens 406 converts the non-polarized diverging light beam 404 to non-polarized collimated light beam 408 (which has parallel light rays).

A polarizing beam-splitter 410 splits the non-polarized collimated light beam 408 into a first linearly polarized collimated light beam 412 and a second linearly polarized collimated light beam 414 with polarization thereof orthogonal to that of the first linearly polarized collimated light beam 412. A mirror 416 may be used for changing the direction of the second linearly polarized collimated light beam 414 to be parallel to that of the first linearly polarized collimated light beam 412. Each of the first and second linearly polarized collimated light beams 412 and 414 passes through a respective polarization-changing component 418 (such as a quarter-wave plate) which acts as a circular polarizer and changes the linearly polarized light beam 412 or 414 into a circularly polarized light beam 422.

Figure 17A:
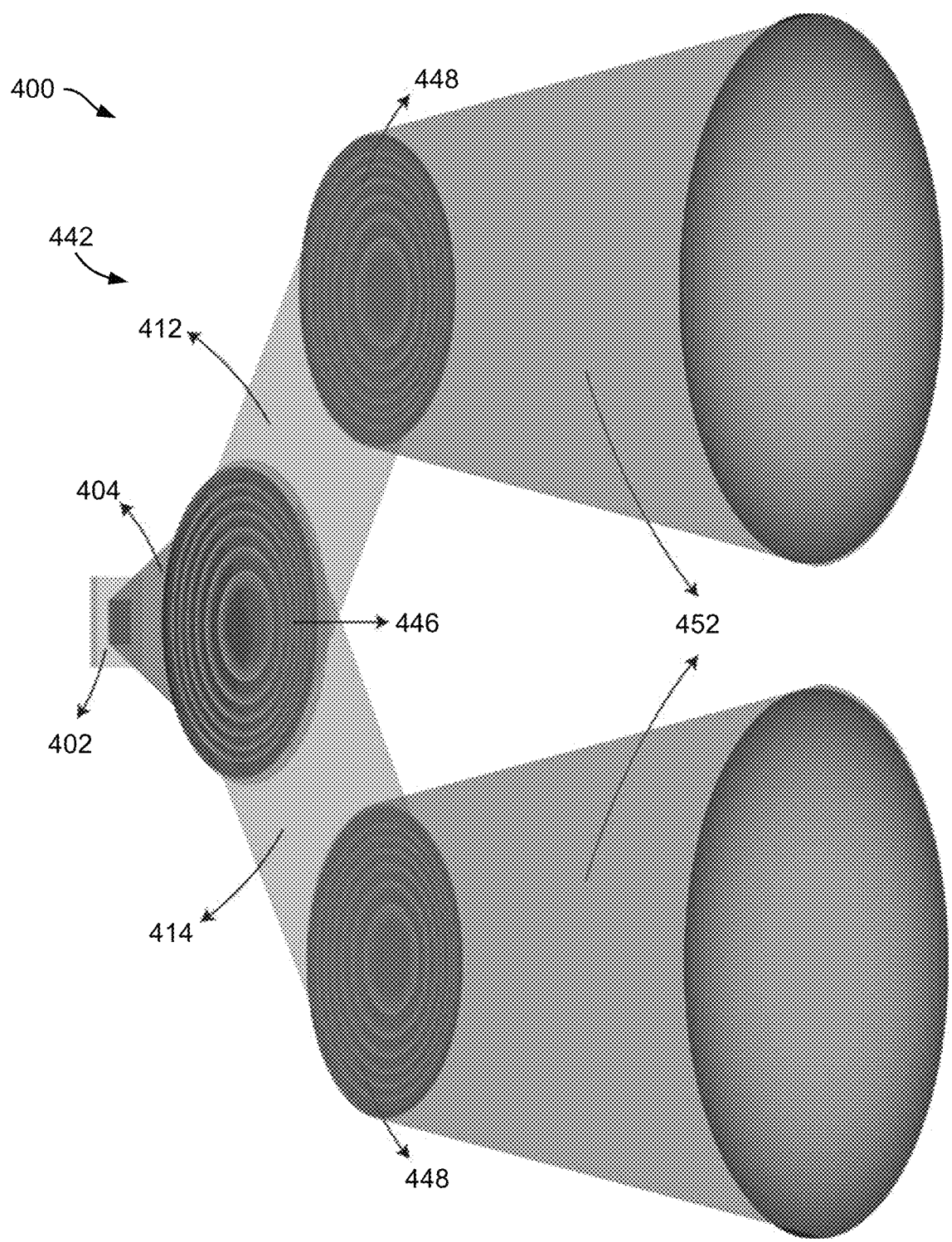
FIGS. 17A and 17B are schematic diagrams showing an optical lens structure for converting non-polarized light (such as LEDs) into a desired polarization state, according to some embodiments of this disclosure.
Figure 17B:
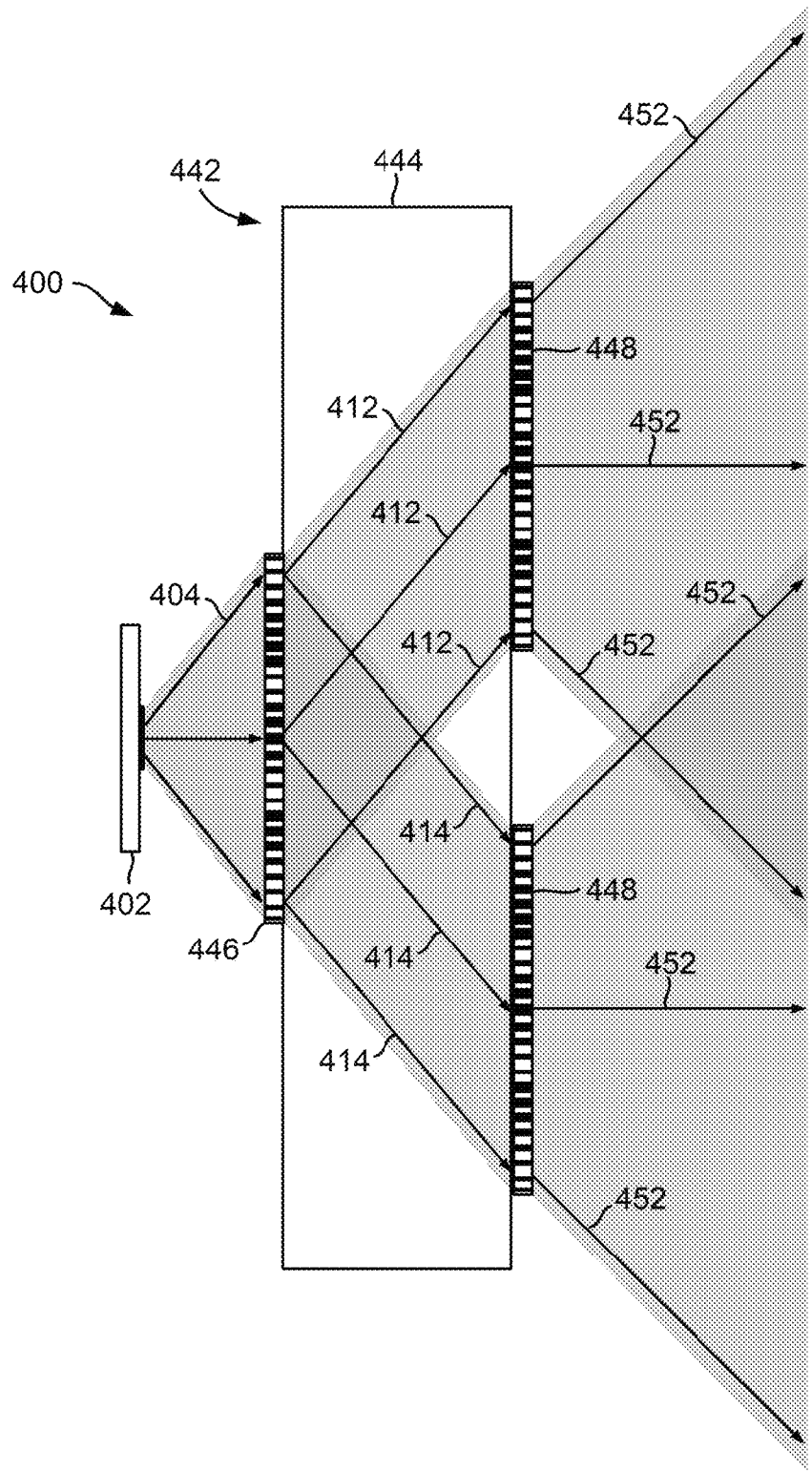

FIGS. 17A and 17B are schematic diagrams showing an optical lens structure 400 for converting non-polarized light (such as LEDs) into a desired polarization state, according to some embodiments of this disclosure. As shown, the optical lens structure 400 comprises a light source 402 (such as a LED) and a lens structure 442. In these embodiments, the lens structure 442 comprises a transparent substrate 444 (such as a glass substrate) with a first metasurface 446 on a first side thereof facing the light source 402, and a plurality of (such as two) second metasurfaces 448 on a second side thereof opposite to the first side.

As those skilled in the art understand, metasurfaces are nanoscale, subwavelength-spaced metamaterials that may bend light and change its polarization state. A metasurface may also be polarization sensitive, which means that the light-bending angle of the metasurface depends on the polarization state of incident light-rays, and therefore such metasurface may be used as a polarizing beam-splitter. In these embodiments, the first metasurface 446 is designed or otherwise configured as a polarizing beam-splitter (similar to the polarizing beam-splitter 410 shown in FIG. 16), and the second metasurfaces 448 are designed or otherwise configured as polarization-changing components (similar to the circular polarizers 418 shown in FIG. 16).

As shown in FIGS. 17A and 17B, the light source 402 emits a non-polarized light beam 404. The non-polarized light beam 404 passes through the first metasurface 446 (which is a polarizing beam-splitter). The first metasurface 446 splits or otherwise divides the non-polarized light beam 404 into two collimated linearly polarized beams 412 and 414 with orthogonal polarization states. Each of the linearly polarized beams 412 and 414 passes through a respective second metasurface 448 (which acts as a circular polarizer) changes the incident linearly polarized beam 412 or 414 to a circularly polarized light beam 452. The second metasurface 448 may also bend the incident beam 412 or 414, for example, toward a plant (not shown).

In the embodiments shown in FIGS. 16 to 17B, the polarization-changing components 418 or 448 acts as circular polarizers for changing the incident light beams from linear polarization to circular polarization. In some embodiments, a polarization-changing component 418 or 448 may change the incident light beams to any desired polarization such as RCP light, left-handed-circularly polarized (LCP) light, or linearly polarized light.

Figure 18:
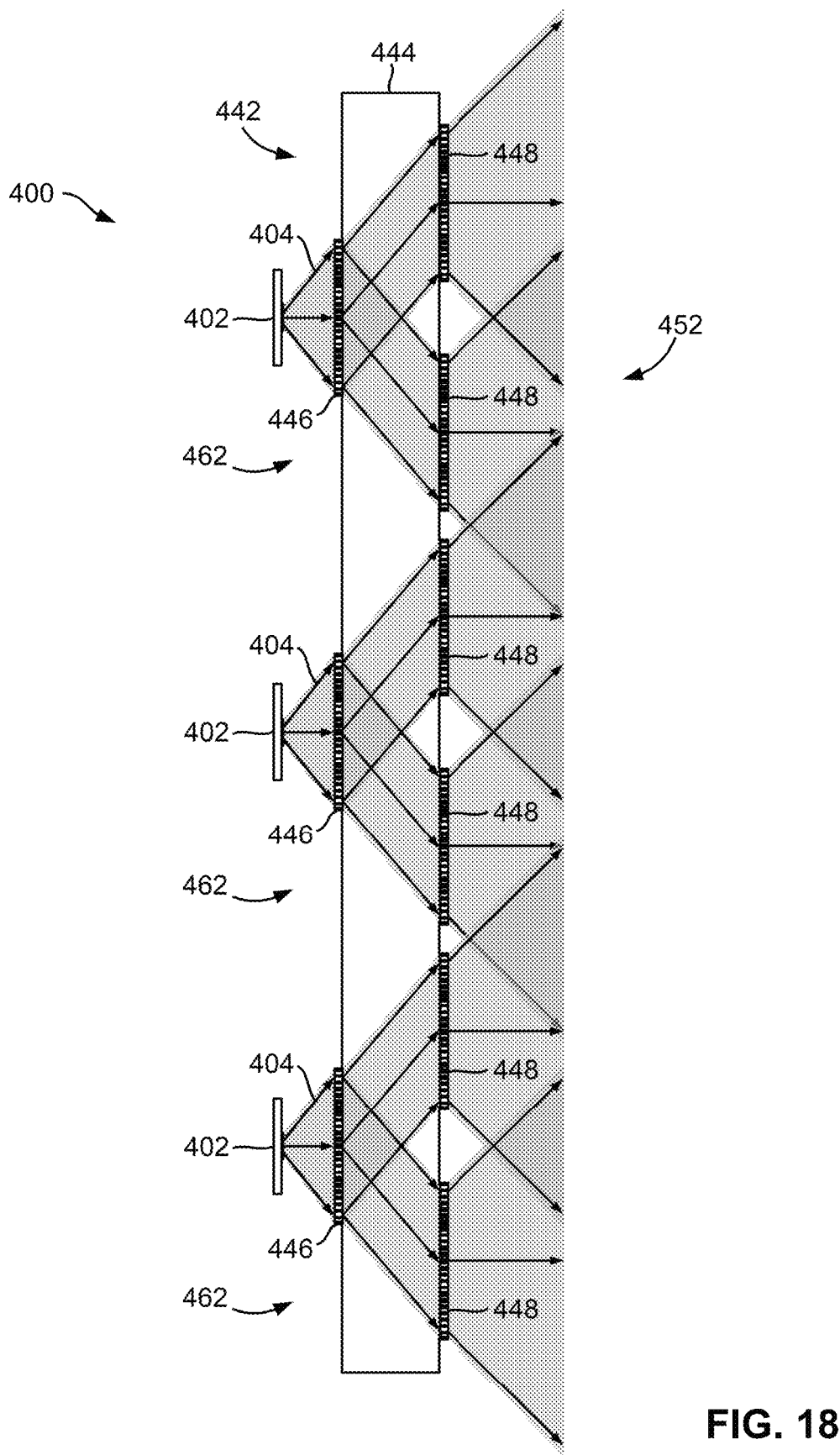
FIG. 18 is a schematic diagram showing an optical lens structure for converting non-polarized light (such as LEDs) into a desired polarization state, according to some embodiments of this disclosure.

FIG. 18 is a schematic diagram showing an optical lens structure 400 for converting non-polarized light (such as LEDs) into a desired polarization state, according to some embodiments of this disclosure. As shown, the optical lens structure 400 comprises a plurality of light sources 402 (such as a LED) and a lens structure 442. In these embodiments, the lens structure 442 comprises a transparent substrate 444 (such as a glass substrate) with a plurality of metasurface sets 462 thereon. Each metasurface set 462 is at a location corresponding to a respective light source 402, and comprises a first metasurface 446 on a first side of the substrate 444 facing the light source 402, and a plurality of (such as two) second metasurfaces 448 on a second side thereof opposite to the first side.

Each metasurface set 462 is designed or otherwise configured to split or otherwise divide a non-polarized light beam 404 to a plurality of (such as two) light beams with orthogonal polarization states and change the polarization states thereof to predefined polarization states.

Compared to the optical lens structure shown in FIG. 16, the optical lens structure 400 shown in FIGS. 17A to 18 is more compact. The optical lens structure 400 shown in FIGS. 17A to 18 is also high efficient, and may convert more than 94% of non-polarized light into polarized light (such as RCP, LCP, linearly polarized, and/or the like).

Although in above embodiments, LED is used as the light source, in some other embodiments, any other suitable light source may be used.

C. References

1. Steigerwald, D. A., et al., *Illumination with solid state lighting technology*. IEEE journal of selected topics in quantum electronics, 2002. 8(2): p. 310-320.
2. Prikupets, L. B., et al., *OPTIMISATION OF LIGHTING PARAMETERS OF IRRADIATION IN LIGHT CULTURE OF LETTUCE PLANTS USING LED EMITTERS*. Light & Engineering, 2019(5).
3. Tabaka, P. and A. Wiśniewski, *MEASUREMENTS OF ELECTRIC, PHOTOMETRIC AND COLORIMETRIC PARAMETERS OF LEDS USING AT DIFFERENT AMBIENT TEMPERATURES*. Light & Engineering, 2014. 22(1).
4. Tabaka, P. and P. Rozga, *Assessment of methods of marking LED sources with the power of equivalent light bulb*. Bulletin of the Polish Academy of Sciences. Technical Sciences, 2017. 65(6).
5. Fryc, I., F. Bisegna, and P. Tabaka. *Lighting of recreation grounds as a source of sky glow the influence of luminaire type on this phenomenon*. in 2017 IEEE International Conference on Environment and Electrical Engineering and 2017 *IEEE Industrial and Commercial Power Systems Europe* (EEEIC/I&CPS Europe). 2017. IEEE.
6. Holonyak Jr, N. and S. Bevacqua, *Coherent (visible) light emission from Ga (Asl-x P x) junctions*. Applied Physics Letters, 1962. 1(4): p. 82-83.
7. Haitz, R. and J. Y. Tsao, *Solid-state lighting: 'The case' 10 years after and future prospects*. physica status solidi (a), 2011. 208(1): p. 17-29.
8. Bula, R. J., et al., *Light-emitting diodes as a radiation source for plants*. HortScience, 1991. 26(2): p. 203-205.
9. Morrow, R. C., *LED lighting in horticulture*. HortScience, 2008. 43(7): p. 1947-1950.
10. Barta, D., et al., *Evaluation of light emitting diode characteristics for a space-based plant irradiation source*. Advances in Space Research, 1992. 12(5): p. 141-149.
11. Emmerich, J. C., et al., *Plant Research Unit lighting system development*. 2004, SAE Technical Paper.
12. Jiang, J., A. Mohagheghi, and M. Moallem, *Energy-Efficient Supplemental LED Lighting Control for a Proof-of-Concept Greenhouse System*. IEEE Transactions on Industrial Electronics, 2019. 67(4): p. 3033-3042.
13. Ding, Y., et al., *Freeform LED lens for uniform illumination*. Optics express, 2008. 16 (17): p. 12958-12966.

Although embodiments have been described above with reference to the accompanying drawings, those of skill in the art will appreciate that variations and modifications may be made without departing from the scope thereof as defined by the appended claims.

What is claimed is:

1. An optical lens for passing therethrough an incident light beam and forming an output light beam towards a target plane at a distance therefrom and perpendicular to the norm thereof, the optical lens comprising:
   a smooth or piecewise-linear first surface having a cross-section profile along an axis perpendicular to the norm of the optical lens for directing the incident light beam to form the output light beam towards the target plane with a light intensity uniformly distributed in a target area of the target plane;
   wherein the cross-section profile of the first surface has a shape for modifying the incident light beam according to a light-modification function:

$$f_L(\theta)=k(\cos\theta)^{-3}$$

for a predefined angular range $\theta<90°$, where $0\leq\theta<90°$ and k is a constant.

2. The optical lens of claim 1, wherein a cross-section of the optical lens along a plane parallel to the norm is a square shape.

3. The optical lens of claim 1, wherein the first surface is symmetrical about the norm.

4. The optical lens of claim 1, wherein the cross-section profile of the first surface comprises a concave curve in the central portion thereof smoothly transitioning to a convex curve in the peripheral portion on each side of the central portion for directing the incident light beam to the target plane with the light intensity uniformly distributed in the target area of the target plane.

5. The optical lens of claim 1, wherein the cross-section profile of the first surface has a shape for modifying the incident light beam such that light intensities in a plurality of concentric target-plane portions of the target area are same; and
   wherein the plurality of concentric target-plane portions of the target area comprises a circular target-plane portion at the center of the target area and one or more target-plane rings concentrically about the circular central target-plane portion, and a radius of the circular central target-plane portion equals to a radial width of each of the target-plane rings.

6. The optical lens of claim 1, wherein at least at a plurality of reference points x of the cross-section profile of the first surface, the cross-section profile has a tangent angle $\beta$ with respect to the axis such that:

$$\frac{\sin\left(\tan^{-1}\left(\frac{x}{L_{chief}}\right)-\beta\right)}{\sin(\varphi-\beta)}=\frac{r_1}{r_2}$$

where $L_{chief}$ is a shortest distance between a first wavefront of the incident light beam at a lens plane of the optical lens and a second wavefront of a light beam outputting from the lens plane, $\varphi$ is a phase difference between the first and second wavefronts, $r_1$ is a refractive index of a medium adjacent the optical lens, and $r_2$ is a refractive index of the optical lens.

7. The optical lens of claim 6, wherein the cross-section profile of the first surface is a piecewise-linear curve along the plurality of reference points, or a smooth curve fitting to the piecewise-linear curve.

8. The optical lens of claim 6, wherein the cross-section profile of the first surface is a smooth polynomial curve fitting to a piecewise-linear curve along the plurality of reference points.

9. A lighting system comprising:
   one or more light sources; and
   one or more optical lens of claim 1;
   wherein each of the one or more optical lens at a location corresponding to a respective one of the one or more light sources.

10. A method comprising:
    determining a first surface of an optical lens for manufacturing the optical lens for passing therethrough an incident light beam and forming an output light beam towards a target plane at a distance therefrom and perpendicular to the norm thereof;
    wherein said determining the first surface of the optical lens comprises:
       determining the first surface as a smooth or piecewise-linear surface having a cross-section profile along an axis perpendicular to the norm of the optical lens for directing the incident light beam to form the output light beam towards the target plane with a light intensity uniformly distributed in a target area of the target plane, and the cross-section profile of the first surface has a shape for modifying the incident light beam according to a light-modification function:

$$f_L(\theta)=k(\cos\theta)^{-3}$$

for a predefined angular range $\theta<90°$, where $0\leq\theta<90°$ and k is a constant.

11. The method of claim 10, wherein the cross-section profile of the first surface comprises a concave curve in the central portion thereof smoothly transitioning to a convex curve in the peripheral portion on each side of the central portion for directing the incident light beam to the target plane with the light intensity uniformly distributed in the target area of the target plane.

12. The method of claim 10, wherein said determining the cross-section profile of the first surface of the optical lens comprises:

determining the cross-section profile of the first surface of the optical lens such that the cross-section profile of the first surface has a shape for modifying the incident light beam such that light intensities in a plurality of concentric target-plane portions of the target area are same; and wherein the plurality of concentric target-plane portions of the target area comprises a circular target-plane portion at the center of the target area and one or more target-plane rings concentrically about the circular central target-plane portion, and a radius of the circular central target-plane portion equals to a radial width of each of the target-plane rings.

13. The method of claim 10, wherein said determining the cross-section profile of the first surface of the optical lens comprises:

determining the cross-section profile of the first surface of the optical lens such that, at least at a plurality of reference points x of the cross-section profile of the first surface, the cross-section profile has a tangent angle $\beta$ with respect to the axis such that:

$$\frac{\sin\left(\tan^{-1}\left(\frac{x}{L_{chief}}\right) - \beta\right)}{\sin(\varphi - \beta)} = \frac{r_1}{r_2}$$

where $L_{chief}$ is a shortest distance between a first wavefront of the incident light beam at a lens plane of the optical lens and a second wavefront of a light beam outputting from the lens plane, $\varphi$ is a phase difference between the first and second wavefronts, $r_1$ is a refractive index of a medium adjacent the optical lens, and $r_2$ is a refractive index of the optical lens.

14. The method of claim 10, wherein said determining the cross-section profile of the first surface of the optical lens comprises:

determining the cross-section profile of the first surface as a piecewise-linear curve along the plurality of reference points, or a smooth curve fitting to the piecewise-linear curve.

15. The method of claim 10, wherein said determining the cross-section profile of the first surface of the optical lens comprises:

partitioning a lens plane of the optical lens into N concentric lens-plane portions (N>1 is an integer) and partitioning the target plane into N concentric target-plane portions with equal widths; and determining the cross-section profile of the surface of the optical lens based on:
(a) light rays passing through each lens-plane portion arriving into a corresponding target-plane portion, and
(b) the N concentric lens-plane portions receiving equal light power, and correspondingly, the N concentric target-plane portions also receiving equal light power.

16. The method of claim 15, wherein said determining the cross-section profile of the surface of the optical lens comprises:

determining widths of the lens-plane portions;
determining wavefronts of the incident light beam at the lens plane and a light beam outputting from the lens plane, respectively;
determining phase difference between the two wavefronts;
determining bending angles along a reference line of the lens plane based on the phase difference;
determining tangent lines for each point of the reference line; and
determining the cross-section profile of the surface of the optical lens using the tangent lines.

17. An optical lens structure comprising:
one or more light-modification sets;
wherein each of the light-modification sets comprises:
a polarizing beam-splitter for splitting an incident light beam into a plurality of intermediate light beams with orthogonal first polarization states, and
a plurality of polarization-changing components each for changing the first polarization state of one of the plurality of intermediate light beams into a predefined second polarization state.

18. The optical lens structure of claim 17, wherein the one or more light-modification sets comprise at least one metasurface set on a transparent substrate;
wherein the metasurface set comprises:
a first metasurface as the polarizing beam-splitter on a first side of the substrate, and
a plurality of second metasurfaces as the plurality of polarization-changing components on a second side of the substrate opposite to the first side.

* * * * *